(12) United States Patent
Heo et al.

(10) Patent No.: US 11,354,453 B2
(45) Date of Patent: Jun. 7, 2022

(54) ENCRYPTION DEVICE FOR ENCRYPTING DATA AND TIMESTAMP, SYSTEM ON CHIP INCLUDING THE SAME, AND ELECTRONIC DEVICE

(71) Applicant: SAMSUNG ELECTRONICS CO., LTD., Suwon-si (KR)

(72) Inventors: Ingoo Heo, Yongin-si (KR); Jaechul Park, Seoul (KR); Youngjin Chung, Seongnam-si (KR); Hong-Mook Choi, Bucheon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 249 days.

(21) Appl. No.: 16/013,993

(22) Filed: Jun. 21, 2018

(65) Prior Publication Data

US 2019/0156069 A1 May 23, 2019

(30) Foreign Application Priority Data

Nov. 23, 2017 (KR) ........................ 10-2017-0157210

(51) Int. Cl.
*G06F 21/78* (2013.01)
*G06F 12/14* (2006.01)
(Continued)

(52) U.S. Cl.
CPC .......... *G06F 21/78* (2013.01); *G06F 12/1408* (2013.01); *G06F 21/602* (2013.01);
(Continued)

(58) Field of Classification Search
CPC .... G06F 21/78; G06F 12/1408; G06F 21/602; G06F 21/71; G06F 21/85
(Continued)

(56) References Cited

U.S. PATENT DOCUMENTS 7,213,149 B2    5/2007  Mache
8,364,682 B1 *  1/2013  Gershony ........... G06F 16/9535
                                             707/739
(Continued)

FOREIGN PATENT DOCUMENTS

KR   1020170136409 A   12/2017
WO   WO2017048221 A1    3/2017

OTHER PUBLICATIONS

Aga, "InvisiMem: Smart Memory for Trusted Computing", 2017, International Symposium on Computer Architecture, pp. 1-13 (Year: 2017).*

*Primary Examiner* — Taghi T Arani
*Assistant Examiner* — Gregory A Lane
(74) *Attorney, Agent, or Firm* — Volentine, Whitt & Francos, PLLC

(57) ABSTRACT

An encryption device includes a counter, an encryption/decryption unit, and a timer. The counter is configured to generate a first timestamp for a first time. The encryption/decryption unit is configured to concatenate security data and the first timestamp, encrypt the concatenated data into encryption data, transmit the encryption data to a memory device, and decrypt read data transmitted from the memory device into decryption data. The timer is configured to inform the counter and the encryption/decryption unit that a time elapses from the first time to a second time such that the counter generates a second timestamp for the second time and the encryption/decryption unit decrypts the read data into the decryption data. Checking logic implemented by the encryption device is configured to check whether a decryption timestamp of the decryption data is identical to the first timestamp.

20 Claims, 21 Drawing Sheets

(51) Int. Cl.
*G06F 21/60* (2013.01)
*G06F 21/85* (2013.01)
*G06F 21/71* (2013.01)

(52) U.S. Cl.
CPC .............. *G06F 21/71* (2013.01); *G06F 21/85* (2013.01); *G06F 2212/1052* (2013.01); *G06F 2212/402* (2013.01); *G06F 2221/2151* (2013.01)

(58) Field of Classification Search
USPC ........................................................ 713/193
See application file for complete search history.

(56) References Cited

U.S. PATENT DOCUMENTS

| | | | |
|---|---|---|---|
| 8,468,365 B2 | 6/2013 | Gueron et al. | |
| 8,705,348 B2 | 4/2014 | Fluhrer et al. | |
| 9,076,019 B2 | 7/2015 | Gueron et al. | |
| 9,269,418 B2 | 2/2016 | Felton et al. | |
| 9,690,922 B2 | 6/2017 | Buer et al. | |
| 2001/0052071 A1* | 12/2001 | Kudo | H04L 9/321 713/156 |
| 2002/0002468 A1* | 1/2002 | Spagna | H04L 69/04 713/193 |
| 2002/0029291 A1* | 3/2002 | Crandall | H04H 60/80 348/E7.063 |
| 2004/0187006 A1* | 9/2004 | Trapp | G06F 21/78 713/176 |
| 2005/0180384 A1* | 8/2005 | Jeong | H04B 1/707 370/350 |
| 2005/0220305 A1* | 10/2005 | Fujimoto | G06F 21/606 380/255 |
| 2007/0118770 A1* | 5/2007 | Kahn | H04N 5/913 713/193 |
| 2007/0169181 A1* | 7/2007 | Roskind | H04L 9/3271 726/5 |
| 2007/0268823 A1* | 11/2007 | Madison | H04L 47/527 370/229 |
| 2008/0247546 A1* | 10/2008 | Kim | H04L 9/0838 380/260 |
| 2010/0086130 A1* | 4/2010 | Wang | G06F 21/10 380/46 |
| 2012/0260023 A1* | 10/2012 | Nagai | G06F 21/81 711/103 |
| 2013/0007471 A1* | 1/2013 | Grab | G06F 21/10 713/193 |
| 2013/0198525 A1* | 8/2013 | Spies | G06F 21/6227 713/189 |
| 2013/0268764 A1* | 10/2013 | Valdes | G06F 21/64 713/178 |
| 2015/0033038 A1* | 1/2015 | Goss | H04L 9/0897 713/193 |
| 2015/0324613 A1 | 11/2015 | Park et al. | |
| 2016/0337850 A1* | 11/2016 | Suh | H04L 63/0892 |
| 2017/0346628 A1 | 11/2017 | Lee et al. | |
| 2017/0366340 A1* | 12/2017 | Wyseur | H04L 9/3242 |
| 2018/0165479 A1* | 6/2018 | Chen | H04L 9/0819 |

* cited by examiner

FIG. 4

| | | | 161 |
|---|---|---|---|
| Address1 → | Security Data1 | Timestamp2 | |
| Address2 → | Security Data2 | Timestamp2 | |
| Address3 → | Security Data3 | Timestamp2 | |
| Address4 → | Security Data4 | Timestamp(Old) | ← Attack 1 |
| Address5 → | Security Data5 | Timestamp2 | |
| Address6 → | Security Data6 → 8 | Timestamp2 | ⎫ |
| Address7 → | Security Data7 | Timestamp2 | ⎬ Attack 2 |
| Address8 → | Security Data8 | Timestamp2 | |
| Address9 → | Security Data9 | Timestamp2 | |

ENCRYPTION DEVICE FOR ENCRYPTING DATA AND TIMESTAMP, SYSTEM ON CHIP INCLUDING THE SAME, AND ELECTRONIC DEVICE

CROSS-REFERENCE TO RELATED APPLICATIONS

This U.S. non-provisional patent application claims priority under 35 U.S.C. § 119 to Korean Patent Application No. 10-2017-0157210, filed on Nov. 23, 2017 in the Korean Intellectual Property Office, the entire contents of which are hereby incorporated by reference.

BACKGROUND

1. Field

Embodiments of the present disclosure relate to an encryption device, a system on chip (SoC) including the same, and an electronic device. More particularly, embodiments of the present disclosure relate to an encryption device for encrypting data and a timestamp, an SoC including the same, and an electronic device.

2. Description of Related Art

An application processor (AP) may be implemented as an SoC. The SoC may be one chip into which various (multiple different) systems are integrated, such as on a single integrated substrate. Since the various systems are integrated into the SoC, a capacity of an internal memory (e.g., a static random-access memory (SRAM)) of the SoC may be limited. Due to the limited capacity of the internal memory, the SoC may communicate with an external memory device.

When the SoC and the external memory device communicate with each other through physical lines and pins that are exposed to the outside, there is a risk that an attacker may probe data transmitted between the SoC and the external memory device. To address such a risk, the SoC may transmit data having an encrypted form to a memory device. Encryption data may be stored in the memory device. Nonetheless, the attacker may observe and accumulate the encryption data and may attack the memory device and the SoC. Thus, there is a need for security technologies capable of defending against various types of attacks.

SUMMARY

Embodiments of the present disclosure provide an encryption device for encrypting data and a timestamp, an SoC including the same, and an electronic device.

According to an aspect of the present disclosure, an encryption device may include a counter, an encryption/decryption unit, and a timer. The counter is configured to generate a first timestamp for a first time. The encryption/decryption unit is configured to concatenate security data and the first timestamp, encrypt the concatenated data into encryption data, transmit the encryption data to a memory device, and decrypt read data transmitted from the memory device into decryption data. The timer is configured to inform the counter and the encryption/decryption unit that a time elapses from the first time to a second time such that the counter generates a second timestamp for the second time and the encryption/decryption unit decrypts the read data into the decryption data. Checking logic implemented by the encryption device is configured to check whether a decryption timestamp of the decryption data is identical to the first timestamp.

According to another aspect of the present disclosure, a system on chip (SoC) may include a processor, a counter, a timer, and an encryption/decryption unit. The processor is configured to generate security data. The counter is configured to generate a timestamp to be concatenated with the security data. The timer is configured to periodically request an update of the timestamp. The encryption/decryption unit is configured to concatenate the security data and the timestamp, encrypt the concatenated data into encryption data, and transmit the encryption data to a memory device in response to a write command of the processor for storing the security data in a memory device, and decrypt read data transmitted from the memory device into decryption data in response to a request of the timer or a request of the processor. Checking logic implemented by the SoC is configured to check whether a decryption timestamp of the decryption data is valid.

According to another aspect of the present disclosure, an electronic device may include a memory device and a system on chip (SoC). The memory device is configured to store first encryption data into which first security data and a first timestamp are encrypted. The system on chip (SoC) is configured to decrypt the first encryption data stored in the memory device, check whether the first timestamp is valid, and store second encryption data, into which the first security data and a second timestamp different from the first timestamp are encrypted, in the memory device instead of the first encryption data based on the checked result.

BRIEF DESCRIPTION OF THE FIGURES

The above and other objects and features will become apparent from the following description with reference to the following figures, wherein like reference numerals refer to like parts throughout the various figures unless otherwise specified, and wherein:

FIG. 4 is a drawing illustrating encryption data stored in an encryption data area of FIG. 1;

DETAILED DESCRIPTION

Hereinafter, embodiments of the present disclosure are described for clarity and in detail so that this disclosure will be thorough and complete and will fully convey the scope of the present disclosure to those skilled in the art.

Figure 1:
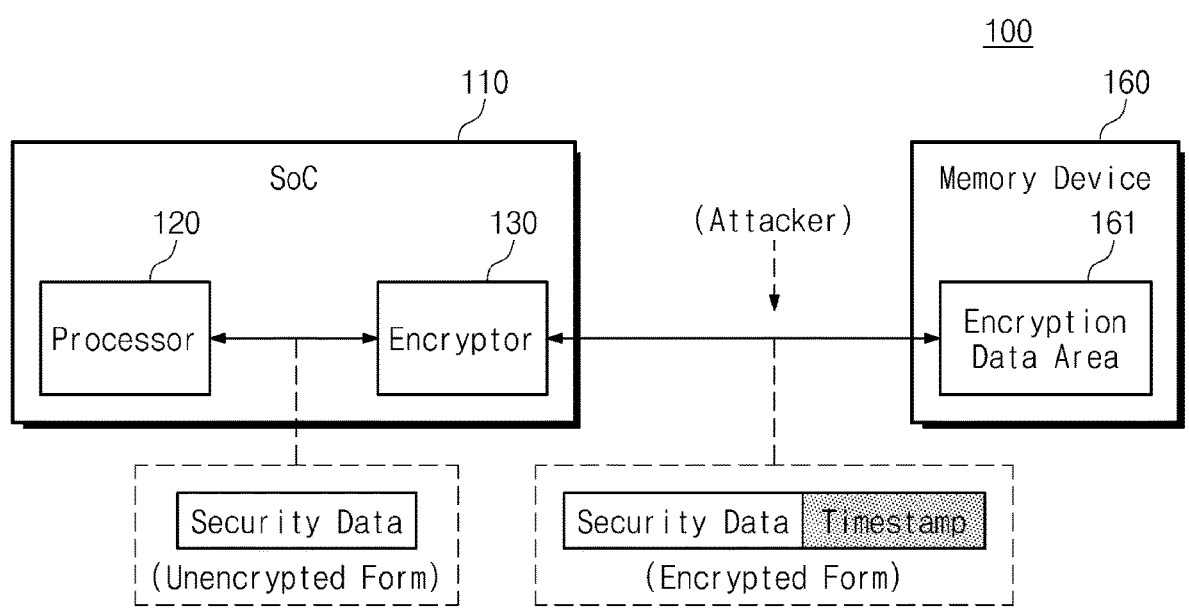
FIG. 1 is a block diagram illustrating a configuration of an electronic device according to an embodiment of the present disclosure.

FIG. 1 is a block diagram illustrating a configuration of an electronic device according to an embodiment of the present disclosure. An electronic device 100 may include a SoC 110 (System on Chip) and a memory device 160.

The SoC 110 may be configured to drive an operating system (OS) and control an overall operation of the electronic device 100. The SoC 110 may execute various applications that the electronic device 100 supports, as an application processor (AP). For this purpose, the SoC 110 may include a processor 120 performing various operations. For example, the processor 120 may be one of a central processing unit (CPU), an image signal processing unit (ISP), a digital signal processing unit (DSP), a graphics processing unit (GPU), a vision processing unit (VPU), and a neural processing unit (NPU). In FIG. 1, an embodiment is exemplified as only the one processor 120. However, embodiments are not limited thereto. For example, the SoC 110 may include one or more processors.

The SoC 110 may include an encryptor 130 for encrypting data stored in the memory device 160. The encryptor 130 may be referred to as an encryption device or an encryption circuit. That is, the encryptor 130 and any other elements of an SoC 110 described herein should be considered to include elements of a device such as a processor and memory, and/or elements of a circuit such as circuitry. The encryptor 130 may be configured to perform an encryption operation on security data transmitted from the processor 120 according to an encryption algorithm. The encryptor 130 may be configured to perform a decryption operation on encryption data transmitted from the memory device 160.

The memory device 160 may store data or may transmit the stored data to the SoC 110, in response to a request of the SoC 110. For example, the memory device 160 may operate as a main memory that the SoC 110 can quickly access. The memory device 160 may be a dynamic random-access memory (DRAM) device. The memory device 160 may be located outside the SoC 110 due to storage capacity, a limited size of the SoC 110, or the like. Referring to FIG. 1, an attacker may probe or observe data between the SoC 110 and the memory device 160.

In an embodiment, to defend against an attack of the attacker, the SoC 110 may transmit encryption data to the memory device 160 and the memory device 160 may include an encryption data area 161 for storing the encryption data. The memory device 160 may transmit encryption data stored in the encryption data area 161 to the SoC 110. Thus, the attacker may obtain only the encryption data and may fail to know data before encryption.

The attacker may observe and accumulate encryption data transmitted and received between the SoC 110 and the memory device 160 for a long time. When any encryption data is stored in the memory device 160, the attacker may observe an operation performed by the SoC 110, an application executed by the SoC 110, or the like. Although the SoC 110 and the memory device 160 transmit and receive encryption data with each other, the attacker may use encryption data obtained through observation for attack. Such an attack of the attacker may be referred to as a replay attack.

A description will be given in detail of the SoC 110 for defending against the replay attack of the attacker. The processor 120 may transmit security data to the encryptor 130. Herein, the security data should be able to be protected from various attacks of the attacker. Since both the processor 120 and the encryptor 130 are implemented in the SoC 110, security data transmitted from the processor 120 to the encryptor 130 may have an unencrypted form. Similarly, security data transmitted from the encryptor 130 to the processor 120 may have an unencrypted form.

The encryptor 130 may concatenate security data and a timestamp and may encrypt the concatenated data into encryption data. The timestamp may include a value associated with a year, a month, a day, an hour, a minute, or a second or a value associated with an operation time. The operation time may include, for example, a time when the processor 120 issues a command for writing security data to the memory device 160, a time when the encryptor 130 receives security data, a time when an encryption operation is performed, a time previously determined in the encryptor 130, or the like.

In FIG. 1, an embodiment is exemplified as the security data and the timestamp are simply concatenated into the encryption data. However, embodiments are not limited thereto. For example, encryption data and a timestamp may be mixed with each other by an encryption operation and encryption data may have an encrypted form. The attacker may fail to verify whether any portion of encryption data corresponds to a timestamp. Hereinafter, a description will be given in detail of the encryptor 130.

Figure 2:
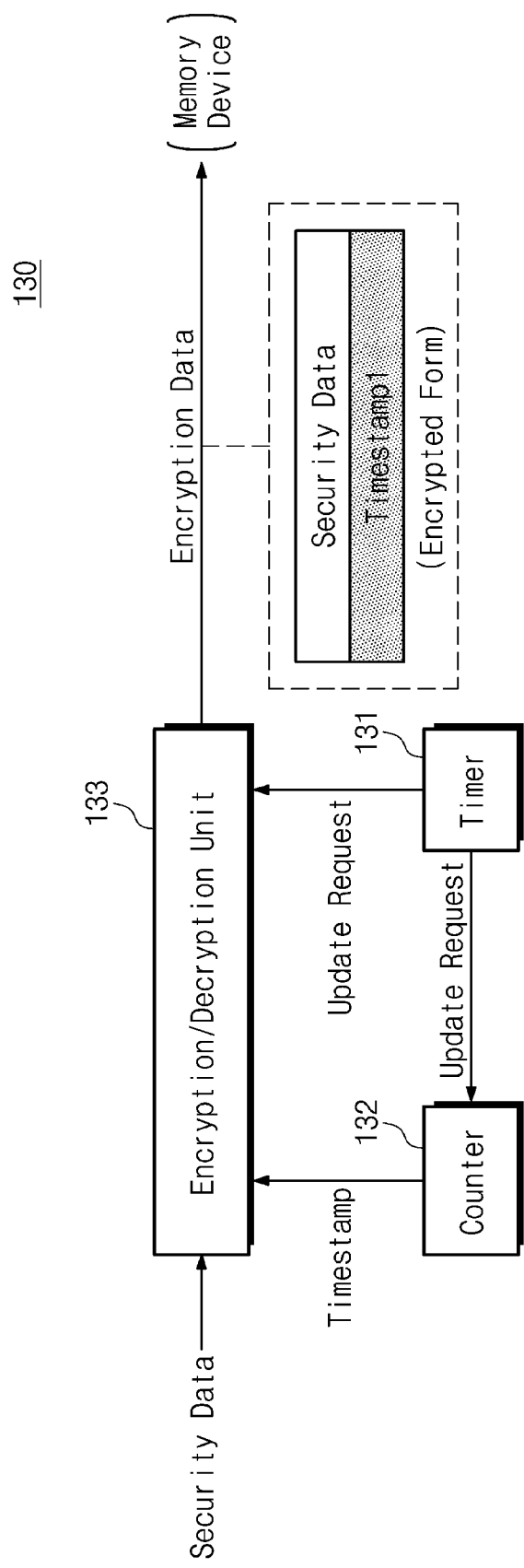
FIG. 2 is a block diagram illustrating a detailed configuration of an encryptor of FIG. 1.

FIG. 2 is a block diagram illustrating a detailed configuration of an encryptor of FIG. 1. FIG. 2 will be described with reference to FIG. 1. To defend against a replay attack of an attacker, an encryptor 130 may periodically update a timestamp stored in a memory device 160 of FIG. 1. For this purpose, the encryptor 130 may include a timer 131 and a counter 132. The encryptor 130 may also include an encryption/decryption unit 133. An encryption/decryption unit 133 may be implemented as circuitry, may also be implemented as a combination of a processor and software executed by the processor, and may further be implemented by a combination of both circuitry and a processor that executes software as well as the software executed by the processor.

The timer 131 may calculate an update period of a timestamp. The timestamp may be concatenated with security data and may be encrypted. When a time elapses by the update period, the timer 131 is configured to request the counter 132 and the encryption/decryption unit 133 to update the timestamp. In detail, the timer 131 may generate an update signal for updating the timestamp.

In an embodiment, the update period may be a predetermined value. As the update period is shorter, security may be more enhanced, but a period for accessing the memory device 160 may be shorter. The update period may be determined in consideration of both security and access to the memory device 160.

In another embodiment, the update period may be a value changed according to a request of a processor 120 of FIG. 1 or a request of a user. The processor 120 or the user may request the encryptor 130 to change the update period according to security data. When specific security data is stored in the memory device 160, the processor 120 or the user may immediately request the encryptor 130 to update a timestamp regardless of the update period.

The counter 132 may generate a timestamp in response to a request of the timer 131 and may transmit the generated timestamp to the encryption/decryption unit 133. The counter 132 may include multiple flip flops. An output of the counter 132 may be used as a timestamp. The output of the counter 132 may be synchronized to a clock of an SoC 110 of FIG. 1. The output of the counter 132 may increase, decrease, or be randomly changed. For example, an output of the counter 132 when a request of the timer 131 occurs may be determined as a timestamp.

The encryption/decryption unit 133 may receive security data from the processor 120 of FIG. 1 and may receive a timestamp from the counter 132. The encryption/decryption unit 133 may concatenate the security data and the timestamp, may encrypt the concatenated data into encryption data, and may transmit the encryption data to the memory device 160.

In an embodiment, the encryption/decryption unit 133 may perform an encryption operation on the concatenated data according to an encryption algorithm. For example, the encryption algorithm may be an advanced encryption standard (AES), a data encryption standard (DES), a triple DES, a SEED, a high security and light weight (HIGHT), an academy, research institute, agency (ARIA), a lightweight encryption algorithm (LEA), or the like. In an embodiment, the encryption algorithm may perform an encryption operation with a block encryption mode. The block encryption mode may be an electronic code book (ECB) mode, a cipher block chaining (CBC) mode, a counter (CTR) mode, a propagating cipher block chaining (PCBC) mode, a cipher feedback (CFB) mode, or the like.

In an embodiment, a size of the security data may be identical to a unit of an encryption operation of the encryption/decryption unit 133. For example, the unit of the encryption operation may be 128 bits. A size of the timestamp may be identical to the unit of the encryption operation. Contrary to being shown in FIG. 2, a concatenated size of the security data and the timestamp may be identical to the unit of the encryption operation.

Referring to FIG. 2, an embodiment is exemplified as the timestamp of the encryption data is a first timestamp.

Hereinafter, a description will be given of an operation of the encryptor 130 according to a request of the timer 131 for an update a timestamp with reference to FIG. 3.

Figure 3:
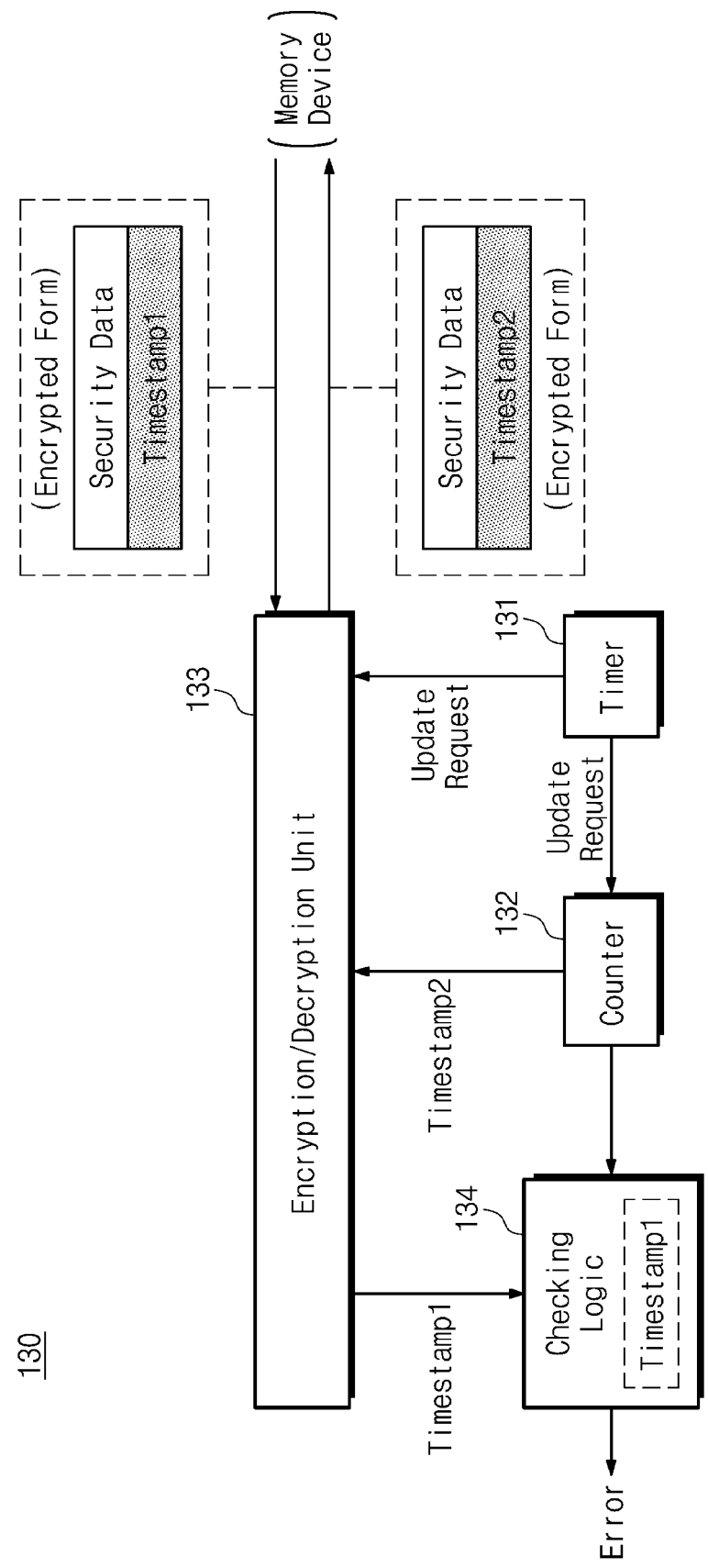
FIG. 3 is a block diagram illustrating an update of a timestamp, performed by an encryptor of FIG. 1.

FIG. 3 is a block diagram illustrating an update of a timestamp, performed by an encryptor of FIG. 1. FIG. 3 will be described with reference to FIGS. 1 and 2. An encryptor 130 may further include a checking logic 134. The checking logic may be implemented as circuitry, such as with memory elements, comparators and other forms of circuit elements. The checking logic may also be implemented as a combination of a processor and software executed by the processor, or by a combination of both circuitry and a processor that executes software and the software executed by the processor.

In FIG. 3, it is assumed that after encryption data including a first timestamp is stored in a memory device 160, a timer 131 requests to update the first timestamp. It is assumed that there is no attack on the memory device 160 of FIG. 1.

A counter 132 may update the first timestamp to a second timestamp in response to a request of a timer 131. The second timestamp and the first timestamp may be different from each other. The counter 132 may transmit the second timestamp to an encryption/decryption unit 133.

The encryption/decryption unit 133 may transmit a read command to the memory device 160 in response to a request of the timer 131. The encryption/decryption unit 133 may receive encryption data (or read data) including the first timestamp using the read command. The encryption/decryption unit 133 may decrypt the encryption data into decryption data. The encryption/decryption unit 133 may transmit a decryption timestamp to the checking logic 134. Since there is no attack, the decryption timestamp may be the first timestamp.

The checking logic 134 may determine or check whether the first timestamp is valid. When the first timestamp is not valid, the checking logic 134 is configured to output an error indicating that the memory device 160 is attacked, to elements (e.g., a processor 120 of FIG. 1) in an SoC 110 of FIG. 1.

In an embodiment, before a request of the timer 131 occurs, the checking logic 134 may store the first timestamp in advance. In another embodiment, when the request of the timer 131 occurs, the checking logic 134 may receive the first timestamp from the counter 132 and may store the first timestamp. The checking logic 134 may include a register for storing the first timestamp. Since the first timestamp, which is transmitted from the counter 132 and is stored in the checking logic 134, exists in the SoC 110, it may be valid. The checking logic 134 may compare the first timestamp stored in the checking logic 134 with a decryption timestamp transmitted from the encryption/decryption unit 133 and may determine or check whether the decryption timestamp is valid based on the compared result.

In FIG. 3, since it is assumed that there is no attack, the checking logic 134 may determine or check that the decryption timestamp is valid and does not output an error.

The encryption/decryption unit 133 may perform an update (or re-encryption) of a timestamp for changing the first timestamp to the second timestamp, based on the determined result or the checked result. An operation of the encryption/decryption unit 133, described with reference to FIG. 2, may be repeated for the update of the timestamp. Herein, a timestamp transmitted from the counter 132 is not the first timestamp but the second timestamp. In detail, when a decryption timestamp is identical to the first timestamp stored in the checking logic 134, the encryption/decryption unit 133 may concatenate security data of decryption data and the second timestamp, may encrypt the concatenated data into new encryption data, and may transmit the new encryption data to the memory device 160.

FIG. 4 is a drawing illustrating encryption data stored in an encryption data area of FIG. 1. FIG. 4 will be described with reference to FIGS. 1 and 3. In FIG. 4, it is assumed that a timestamp of encryption data is updated from a first timestamp to a second timestamp according to an update of the timestamp.

A first security data Security Data1 and the second timestamp Timestamp2 may be stored as a first encryption data in an encryption data area 161 of a memory device 160 of FIG. 1. Second security data Security Data2 to ninth security data Security Data9 may be respectively stored as second encryption data to ninth encryption data in the encryption data area 161 in a similar manner to the first security data Security Data1. In FIG. 4, one row may indicate encryption data, and the first encryption data to ninth encryption data may be stored in data areas corresponding to first address Address1 to ninth address Address9, respectively. In FIG. 4, an embodiment is exemplified as security data and a timestamp are divided. However, embodiments are not limited thereto. For example, the security data and the timestamp may be stored in the encryption data area 161 in the form of being encrypted. The number of addresses and the number of encryption data are not limited to being shown.

An attacker may observe the fourth encryption data stored in an area corresponding to the fourth address Address4. The observation of the attacker may be performed before the second timestamp Timestamp2 is updated. After the second timestamp Timestamp2 is updated, the attacker may write the previously observed fourth encryption data in the encryption data area 161 (i.e., a first attack Attack1). In this case, a timestamp of the fourth encryption data written in the encryption data area 161 by the attacker may be older than the second timestamp Timestamp2.

With respect to the first attack Attack1, in response to a request of a timer 131 of FIG. 3, an encryption/decryption unit 133 of FIG. 3 may decrypt the fourth encryption data into decryption data and a checking logic 134 of FIG. 3 may determine or check whether a decryption timestamp is valid. The decryption timestamp may be stored in the encryption data area 161 by the first attack Attack1. Since the decryption timestamp is not identical to the second timestamp stored in the checking logic 134, the checking logic 134 may output an error indicating that the encryption data area 161 is attacked. In other words, an encryptor 130 of FIG. 1 may defend against the first attack Attack1.

According to an embodiment of the present disclosure, the encryptor 130 may periodically update a timestamp stored in the encryption data area 161. Thus, the encryptor 130 may defend against the first attack Attack1 which uses a previous timestamp.

The attacker may write or copy the eighth encryption data stored in a data area corresponding the eighth address Address8 into a data area corresponding to the sixth address Address6 (i.e., a second attack Attack2). Herein, an address accessed by the attacker may be only an example. The sixth security data Security Data6 of the sixth encryption data may be changed to the eighth security data Security Data8 by the second attack Attack2. When the second attack Attack2 is performed within an update period for a timestamp of the encryptor 130, since the second timestamp Timestamp2 is not changed by the second attack Attack2, the encryptor 130 may fail to defend against the second attack Attack2. To defend against the second attack Attack2, the encryptor 130 may further concatenate an address for security data as well as a timestamp with the security data to generate encryption data. Hereinafter, a description will be given of an example in which an address is further concatenated with security data with reference to FIG. 5.

Figure 5:
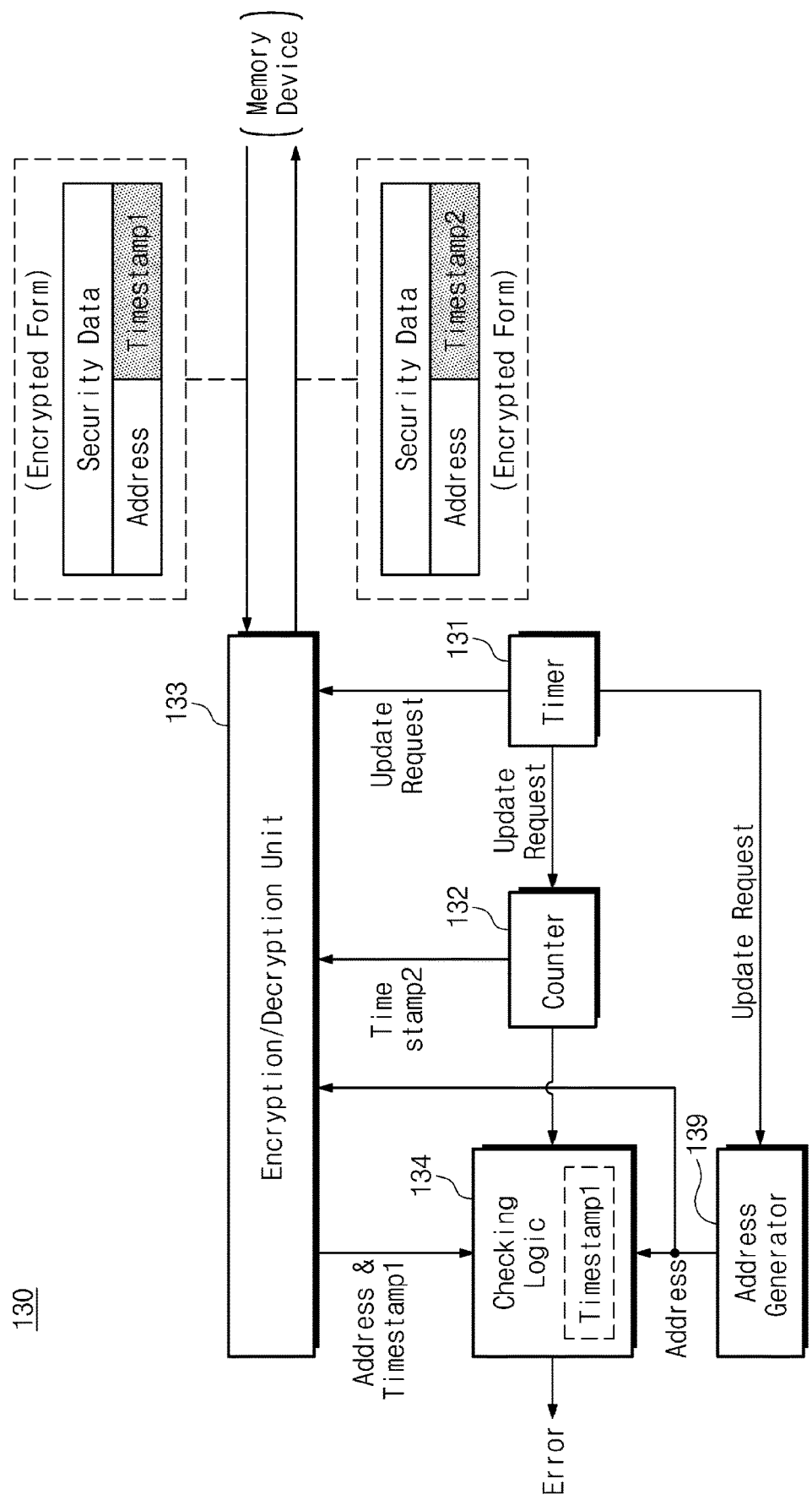
FIG. 5 is a block diagram illustrating an update of a timestamp, performed by an encryptor of FIG. 1, according to another embodiment of the present disclosure.

FIG. 5 is a block diagram illustrating an update of a timestamp, performed by an encryptor of FIG. 1, according to another embodiment of the present disclosure. In FIG. 5, a description will be given of a difference between an encryptor 130 of FIG. 5 and an encryptor 130 of FIG. 3.

An encryption/decryption unit 133 may further concatenate an address as well as a timestamp with security data. A processor 120 of FIG. 1 may transmit an address indicating a location where security data is stored in an encryption data area 161 of FIG. 1 to an encryptor 130 of FIG. 1. Data concatenated with security data may be referred to as a "tag". In FIGS. 2 and 3, the tag may include only a timestamp, but, in FIG. 5, the tag may further include an address. The encryption/decryption unit 133 may encrypt the concatenated data. In other words, encryption data may further include an encrypted address. The encryption/decryption unit 133 may perform a decryption operation and may transmit a decryption address and a decryption timestamp of decryption data to a checking logic 134.

In an embodiment, a size of security data may be identical to a unit of an encryption operation of the encryption/decryption unit 133. A concatenated size of an address and a timestamp may be smaller than the unit of the encryption operation of the encryption/decryption unit 133 without being identical to the unit of the encryption operation of the encryption/decryption unit 133. Alternatively, the concatenated size of the address and the timestamp may be identical to the unit of the encryption operation of the encryption/decryption unit 133. A size of the timestamp may be preset such that the concatenated size of the address and the timestamp is identical to the unit of the encryption operation.

In another embodiment, a concatenated size of security data, an address, and a timestamp may be identical to the unit of the encryption operation of the encryption/decryption unit 133. In this case, a size of the timestamp may be preset such that the concatenated size of the security data, the address, and the timestamp is identical to the unit of the encryption operation.

The checking logic 134 may determine or check whether each of a decryption address and a decryption timestamp is valid. In this case, when the decryption address is not valid or when the decryption timestamp is not valid, the checking logic 134 may output an error to elements in an SoC 110 of FIG. 1.

The checking logic 134 may store an address of a memory device 160 of FIG. 1 in advance and may include a register (not shown) for storing the address. The encryptor 130 may further include an address generator 139 generating an address for accessing the encryption data area 161 of the memory device 160. For example, the address generator 139 may be implemented using at least one counter.

An address generated by the address generator 139 may be sequentially increased or decreased, or may be randomly changed. In response to a request of the timer 131, the address generator 139 may generate an address for accessing all of the encryption data area 161. The encryption/decryption unit 133 may access all of the encryption data area 161 in response to a request of the timer 131 without a request of the processor 120. The address generator 139 may transmit an address to the encryption/decryption unit 133, and the encryption/decryption unit 133 may use the address generated by the address generator 139 to access the encryption data area 161. Of course, the address generator 139 may be used in the encryptor 130 of FIG. 3.

The address generated by the address generator 139 may be used by the checking logic 134. Since the address generated by the address generator 139 exists in the SoC 110, the address may be valid and may be identical to an address transmitted by the processor 120. The checking logic 134 may compare an address of the address generator 139 (i.e., an address for security data) with a decryption address transmitted from the encryption/decryption unit 133, and may determine or check whether the decryption address is valid based on the compared result.

When a decryption address is identical to an address of the address generator 139 (i.e., an address for security data) and when a decryption timestamp is identical to a first timestamp stored in the checking logic 134, the encryption/decryption unit 133 may concatenate security data, a decryption address, and a second timestamp of decryption data, may encrypt the concatenated data into new encryption data, and may transmit the new encryption data to the memory device 160.

Figure 6:
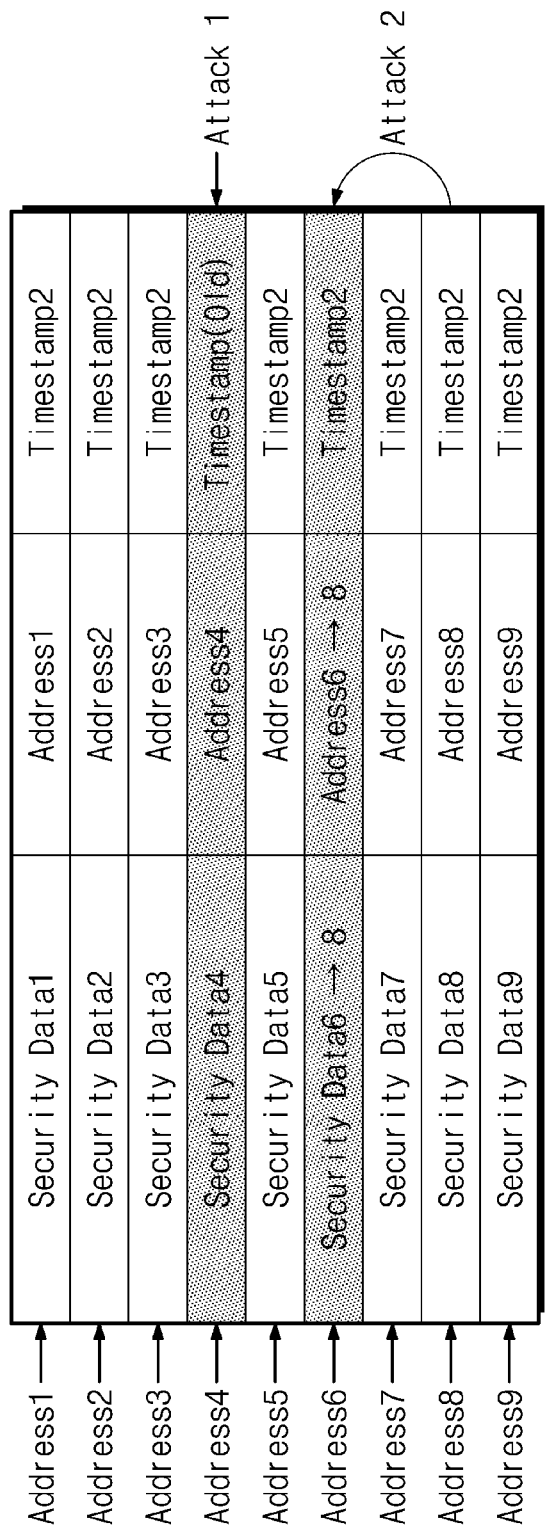
FIG. 6 is a drawing illustrating encryption data stored in an encryption data area of FIG. 1 by an encryptor of FIG. 5.

FIG. 6 is a drawing illustrating encryption data stored in an encryption data area of FIG. 1 by an encryptor of FIG. 5. FIG. 6 will be described with reference to FIGS. 4 and 5. In FIG. 4, an encrypted address is not included in encryption data, but, in FIG. 6, an encrypted address may be included in encryption data. FIG. 4 illustrates encryption data stored by an encryptor 130 of FIG. 3. FIG. 6 illustrates encryption data stored by an encryptor 130 of FIG. 5.

Similar to being described with reference to FIG. 4, the encryptor 130 of FIG. 5 may defend against a first attack Attack1 of an attacker. Contrary to being described with reference to FIG. 4, the encryptor 130 of FIG. 5 may also defend against a second attack Attack2 of the attacker. A second timestamp Timestamp2 of a sixth encryption data is not changed by the second attack Attack2, but a sixth address Address6 may be changed to an eighth address Address8 by the second attack Attack2. With respect to the second attack Attack2, an encryption/decryption unit 133 of FIG. 5 may decrypt the sixth encryption data into decryption data and a checking logic 134 of FIG. 5 may determine or check whether each of a decryption timestamp and a decryption address is valid. Herein, since the decryption address (i.e., the eighth address Address8) is changed by the second attack Attack2, it may not be identical to an address of an address generator 139 in an SoC 110 of FIG. 1. Thus, the checking logic 134 may output an error, and the encryptor 130 may defend against the second attack Attack2.

Figure 7:
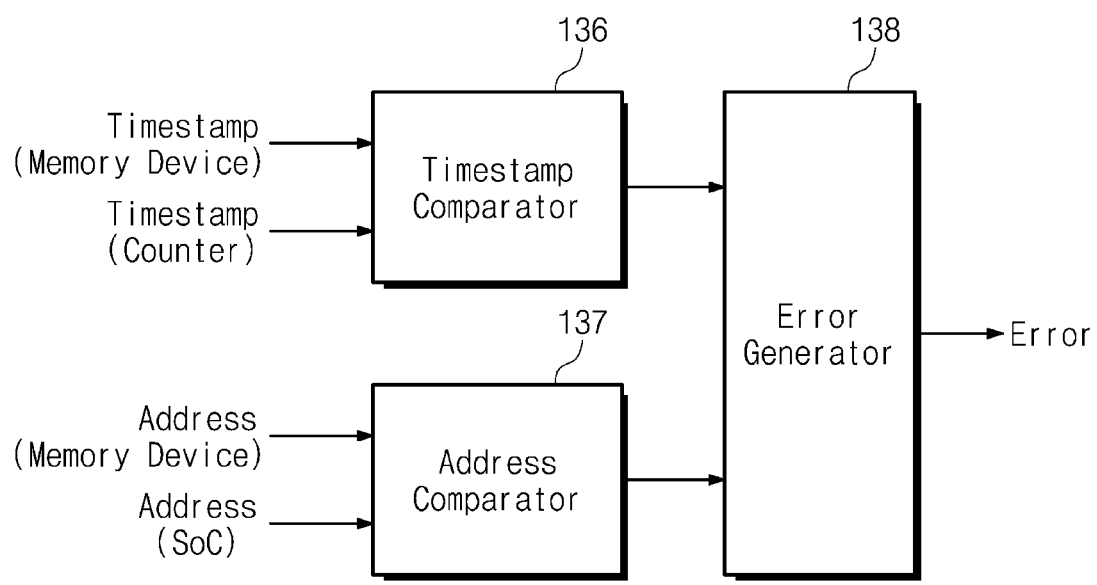
FIG. 7 is a block diagram illustrating a detailed configuration of a checking logic of FIG. 5.

FIG. 7 is a block diagram illustrating a detailed configuration of a checking logic of FIG. 5. FIG. 7 will be described with reference to FIGS. 1 and 5. A checking logic 134 of FIG. 5 may include a timestamp comparator 136, an address comparator 137, and an error generator 138.

The timestamp comparator 136 may compare a timestamp which is transmitted from a memory device 160 of FIG. 1 and is decrypted by an encryption/decryption unit 133 of FIG. 5 with a timestamp in an SoC 110 of FIG. 1. The timestamp in the SoC 110 may be a timestamp which is generated by the counter 132 and is not output to the outside of the SoC 110. The timestamp comparator 136 may transmit the compared result to the error generator 138.

The address comparator 137 may compare an address which is transmitted from the memory device 160 and is decrypted with an address in the SoC 110. The address in the SoC 110 may be an address which is generated by an address generator 139 of FIG. 5 and is not output to the outside of the SoC 110. The address comparator 137 may transmit the compared result to the error generator 138.

The error generator 138 may output an error based on the compared results of the timestamp comparator 136 and the address comparator 137. When the compared result of the timestamp comparator 136 indicates that a decryption timestamp is not valid or when the compared result of the address comparator 137 indicates that a decryption address is not valid, the error generator 138 may output the error.

In an embodiment, the error may be transmitted to a processor 120 of FIG. 1. The error may be output through a dedicated pin assigned between the processor 120 and an encryptor 130 of FIG. 1. The error may be output via a bus (not shown) which operates according to an interface between the processor 120 and the encryptor 130. When the error is output via the bus, a form of the error output from the error generator 138 may be previously defined according to a protocol between the processor 120 and the encryptor 130.

In another embodiment, the error may be transmitted to another element (not shown) of an electronic device 100 of FIG. 1. For example, the error may be transmitted to a display serial interface (DSI) device (not shown) such that a user may check the error. The error may be output through a dedicated pin assigned between the SoC 110 and another element or through a bus which operates according to an interface between the SoC 110 and another element.

Figure 8:
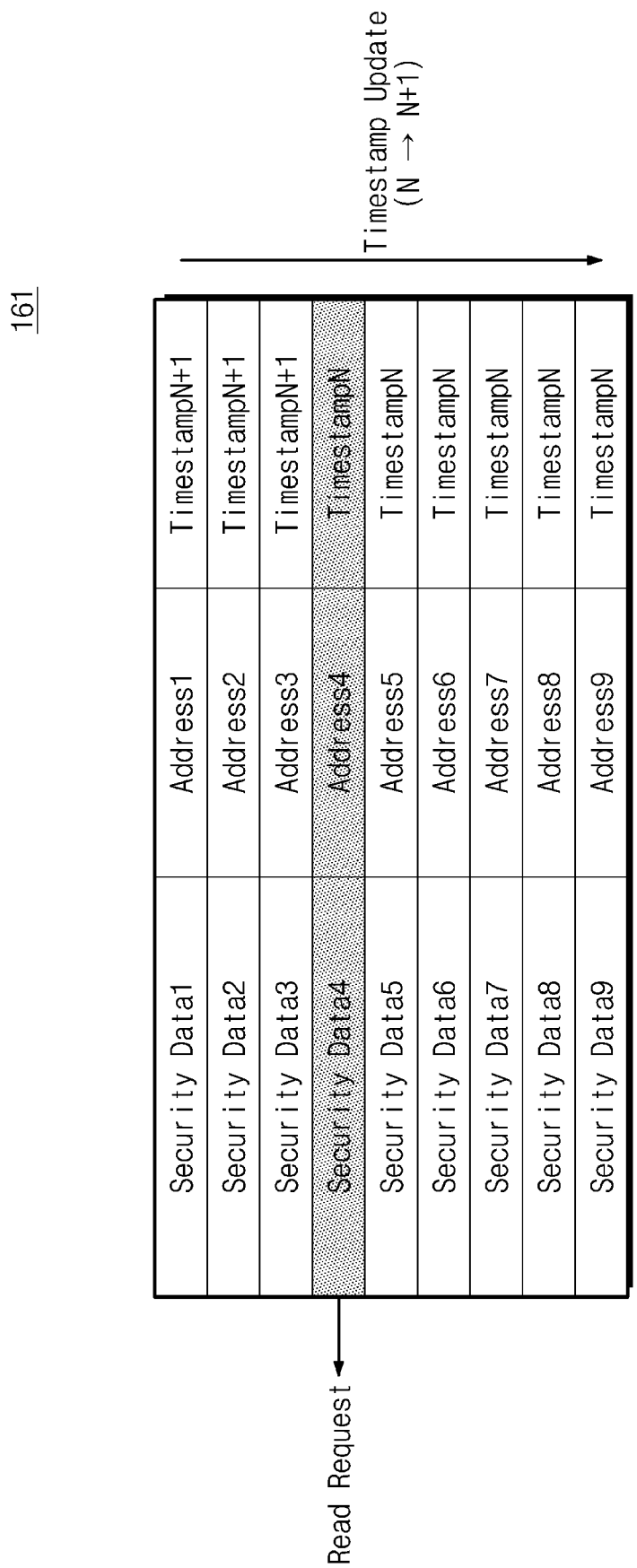
FIG. 8 is a drawing illustrating an example in which a processor of FIG. 1 requests data stored in an encryption data area.

FIG. 8 is a drawing illustrating an example in which a processor of FIG. 1 requests data stored in an encryption data area. FIG. 8 will be described with reference to FIGS. 1 and 6. In FIG. 8, similar to FIG. 6, first encryption data to ninth encryption data may be stored in an encryption data area 161. The number of encryption data is not limited to being shown. Timestamps of the first encryption data to ninth encryption data may be updated from an Nth timestamp to an N+1th timestamp. In FIG. 8, it is assumed that the timestamps of the first encryption data to third encryption data is updated to the N+1th timestamp. It is assumed that the timestamps of the fourth encryption data to ninth encryption data is not updated to the N+1th timestamp.

A processor 120 of FIG. 1 may transmit a read command for fourth security data Security Data4 to an encryptor 130 of FIG. 1. The encryptor 130 may request a memory device 160 of FIG. 1 to transmit the fourth encryption data including the fourth security data Security Data4 in response to the read command of the processor 120. According to the above-mentioned assumption, the timestamp included in the fourth encryption data may be the Nth timestamp. Hereinafter, a description will be given of an operation of processing the read command of the processor 120.

Figure 9:
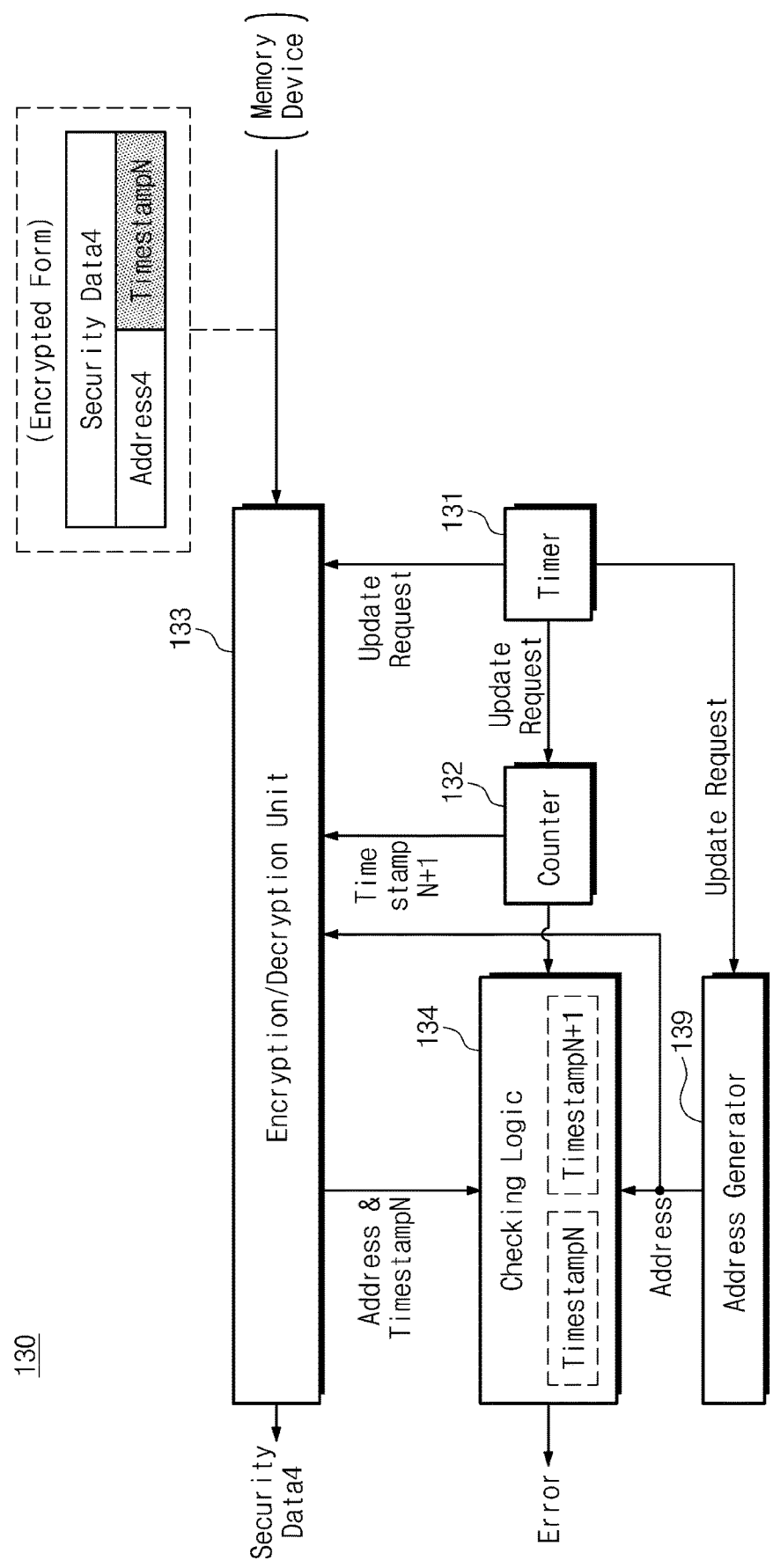
FIG. 9 is a block diagram illustrating an operation of an encryptor which processes a read command of a processor described with reference to FIG. 8.

FIG. 9 is a block diagram illustrating an operation of an encryptor which processes a read command of a processor described with reference to FIG. 8. FIG. 9 will be described with reference to FIGS. 1, 5, and 8. A description will be given of a difference between an encryptor 130 of FIG. 9 and an encryptor 130 of FIG. 5 and an operation of processing a read command of a processor 120 of FIG. 1.

When a time elapses by an update period of a timestamp, a timer 131 may request a counter 132 and an encryption/decryption unit 133 to update a timestamp, such that a timestamp of encryption data stored in an encryption data area 161 of FIG. 8 is updated from an Nth timestamp to an N+1th timestamp. The counter 132 may transmit the N+1th timestamp to the encryption/decryption unit 133 in response to a request of the timer 131.

In an embodiment, a checking logic 134 may store all of Nth and N+1th timestamps therein. While a timestamp of encryption data is updated, as shown in FIG. 8, each of timestamps of the encryption data area 161 may be the Nth timestamp or the N+1th timestamp. Thus, when a decryption timestamp is identical to one of the Nth timestamp and the N+1th timestamp, the checking logic 134 may determine or check whether decryption data is valid. For this purpose, the checking logic 134 may perform comparison operations on two timestamps (i.e., the Nth timestamp and the N+1th timestamp), respectively.

Referring to FIG. 9, the encryption/decryption unit 133 may decrypt fourth encryption data into decryption data and may transmit a decryption address and an Nth timestamp to the checking logic 134. The checking logic 134 may determine or check whether each of the decryption address and the Nth timestamp is valid.

In an embodiment, the checking logic 134 may determine or check whether the decryption address is identical to an address transmitted together with a read command from a processor 120 of FIG. 1. In other words, when the checking logic 134 operates in response to the read command of the processor 120, an address generated by an address generator 139 may not be used for a comparison operation of the checking logic 134. On the other hand, when the checking logic 134 operates in response to a request of a timestamp of the timer 131, an address generated by the address generator 139 may be used for a comparison operation of the checking logic 134.

If both the decryption address and the Nth timestamp are valid, the checking logic 134 does not output an error. The encryption/decryption unit 133 may output fourth security data Security Data4 to the processor 120 based on the determined result or the checked result. In other words, the read command of the processor 120 may be processed.

Figure 10:
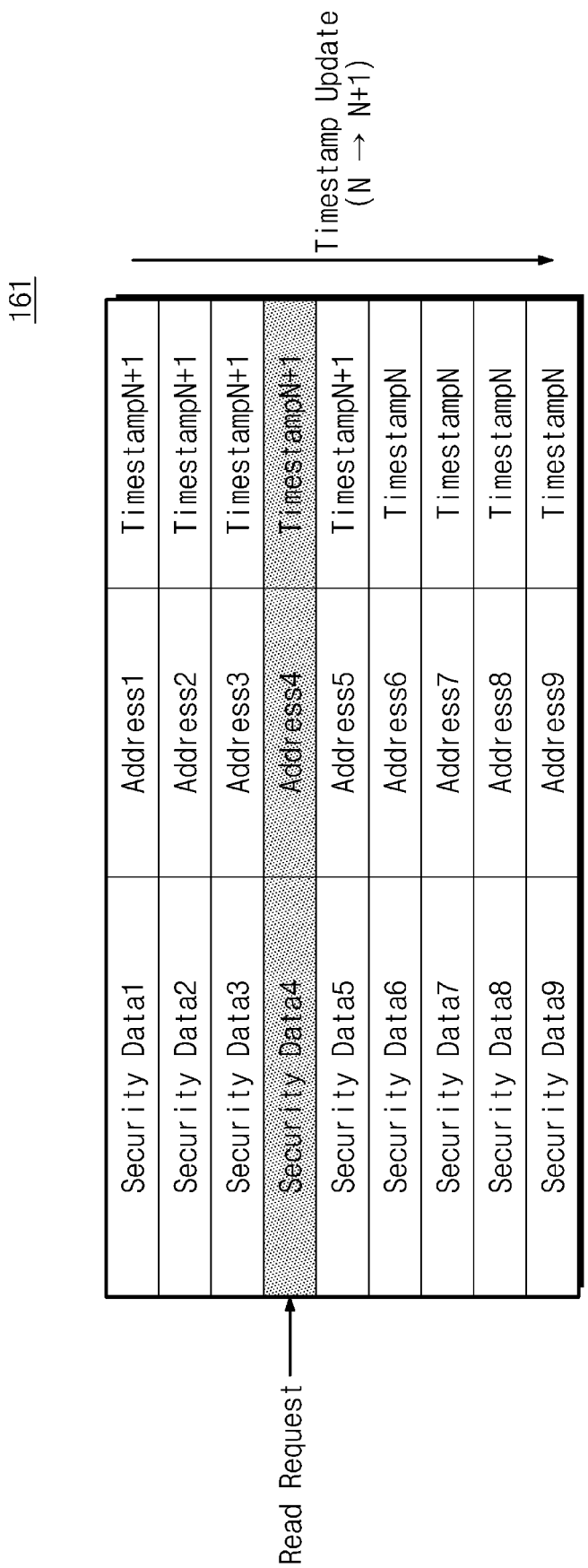
FIG. 10 is a drawing illustrating an example in which a processor of FIG. 1 requests data stored in an encryption data area.

FIG. 10 is a drawing illustrating an example in which a processor of FIG. 1 requests data stored in an encryption data area. FIG. 10 will be described with reference to FIGS. 1 and 8. In FIG. 10, contrary to FIG. 8, it is assumed that timestamps of first encryption data to fifth encryption data are updated to an N+1th timestamp. It is assumed that timestamps of sixth encryption data to ninth encryption data are not updated to the N+1th timestamp. Similar to FIG. 8, a processor 120 of FIG. 1 may transmit a read command for fourth security data Security Data4 to an encryptor 130 of FIG. 1. The encryptor 130 may request a memory device 160 of FIG. 1 to transmit the fourth encryption data including the fourth security data Security Data4 in response to the read command of the processor 120.

Figure 11:
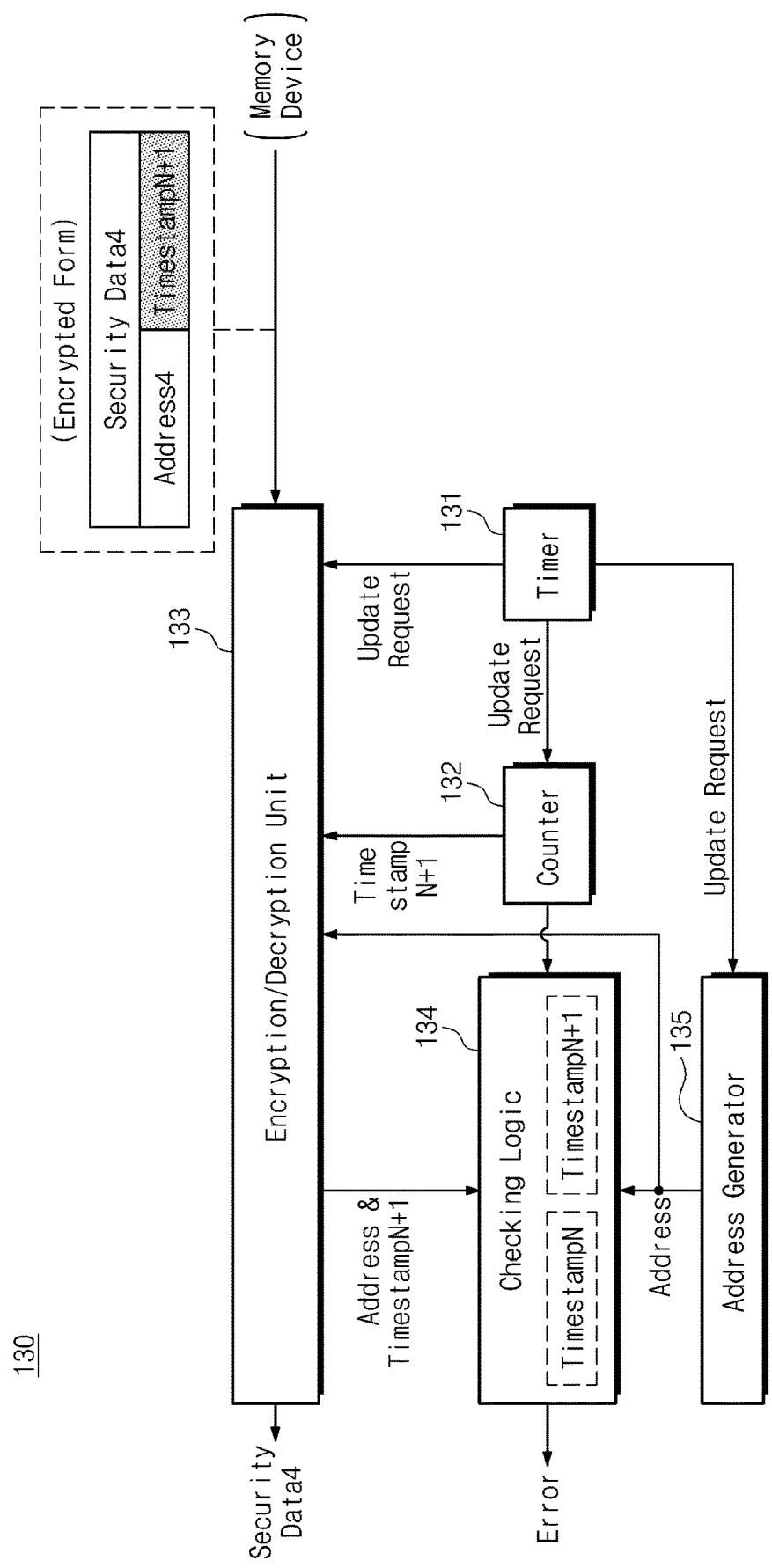
FIG. 11 is a block diagram illustrating an operation of an encryptor which processes a read command of a processor described with reference to FIG. 10.

FIG. 11 is a block diagram illustrating an operation of an encryptor which processes a read command of a processor described with reference to FIG. 10. FIG. 11 will be described with reference to FIGS. 9 and 10. A description will be given of a difference between an encryptor 130 of FIG. 11 and an encryptor 130 of FIG. 9.

An encryption/decryption unit 133 may decrypt fourth encryption data into decryption data and may transmit a decryption address and an N+1th timestamp to a checking logic 134. When there is no attack on a memory device 160 of FIG. 1, the checking logic 134 may determine or check that each of an address and an N+1th timestamp is valid, and does not output an error. The encryption/decryption unit 133 may output fourth security data Security Data4 to a processor 120 of FIG. 1 based on the determined result or the checked result.

Figure 12:
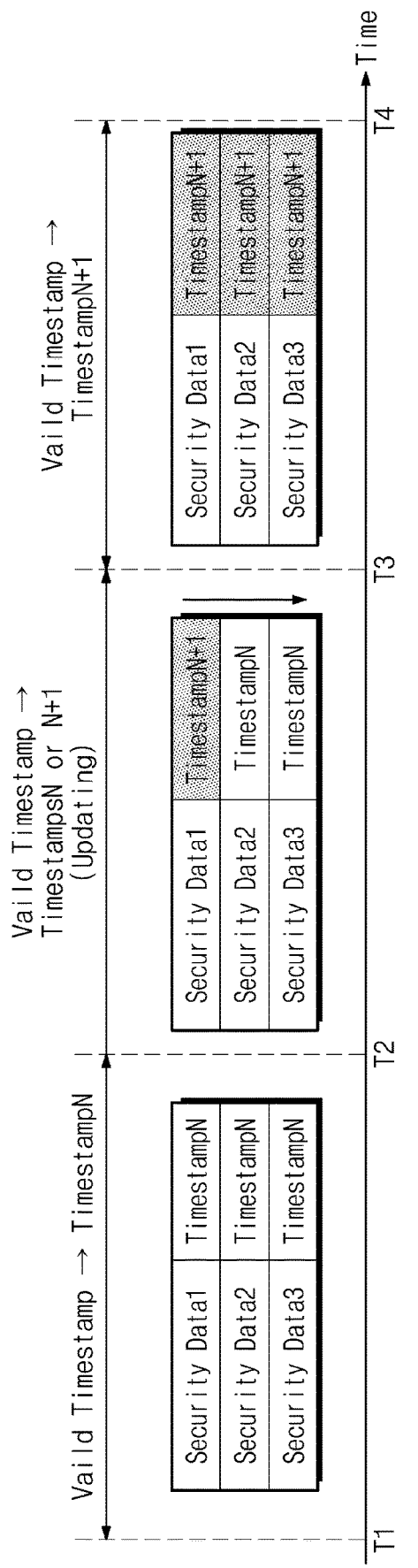
FIG. 12 is a drawing illustrating an operation in which a timestamp stored in a memory device is updated by an encryptor of FIG. 1.

FIG. 12 is a drawing illustrating an operation in which a timestamp stored in a memory device is updated by an encryptor of FIG. 1. FIG. 12 will be described with reference to FIGS. 1 to 3. In FIG. 12, it is assumed that first encryption data to third encryption data are stored in an encryption data area 161 of FIG. 1. Herein, the number of the first encryption data to third encryption data is not limited to being shown, and first address to third address (not shown) encrypted by an encryption/decryption unit 133 are further included in the first encryption data to third encryption data.

Time T1 may indicate a time when timestamps of the first encryption data to third encryption data are updated to an Nth timestamp. During time T1 to Time T2, each of the timestamps of the first encryption data to third encryption data may be the Nth timestamp. The Nth timestamp may be stored in a checking logic 134, as a valid timestamp. During Time T1 to Time T2, when a processor 120 of FIG. 1 issues a read command, the encryptor 130 may determine or check whether a timestamp of encryption data according to a read request is identical to the Nth timestamp.

At time T2, the encryptor 130 may start an operation of updating all of the timestamps of the first encryption data to third encryption data to an N+1th timestamp. During time T2 to time T3, the encryptor 130 may sequentially update the timestamps of the first encryption data to third encryption data to the N+1th timestamp. Herein, contrary to being shown, the encryptor 130 may randomly update the timestamps of the first encryption data to third encryption data to the N+1th timestamp.

An interval between time T2 and time T3 may correspond to an interval where an update is performed, rather than an update period. Further, in FIG. 12, an embodiment is exemplified as an interval between time T1 and time T2 is identical to the interval between time T2 and time T3. However, embodiments are not limited thereto. For example, the interval between time T2 and time T3 may be shorter than the interval between time T1 and time T2.

During time T2 to time T3, the Nth timestamp and the N+1th timestamp may be respectively stored in the checking logic 134, as valid timestamps. During time T2 to time T3, when the processor 120 issues a read command, the encryptor 130 may determine or check whether a timestamp of encryption data according to a read request is identical to the Nth timestamp or the N+1th timestamp.

Time T3 may indicate a time when the timestamps of the first encryption data to third encryption data are updated to the N+1th timestamp by the encryptor 130. An operation of the encryptor 130 during time T3 to time T4 may be similar to an operation of the encryptor 130 between time T1 and time T2. Further, an operation of the encryptor 130 after time T4 may be similar to an operation of the encryptor 130 after time T2. After time T4, the first encryption data to third encryption data having the N+1th timestamp may be stored in the encryption data area 161 of FIG. 1 instead of the first encryption data to third encryption data having the Nth timestamp.

In an embodiment, an interval between time T2 and time T4 may be identical to an update period of a timestamp. For example, a timer 131 may be configured to inform a counter 132 and the encryption/decryption unit 133 that a time elapses from time T2 to time T4 and request the counter 132 and the encryption/decryption unit 133 to update a timestamp.

Figure 13:
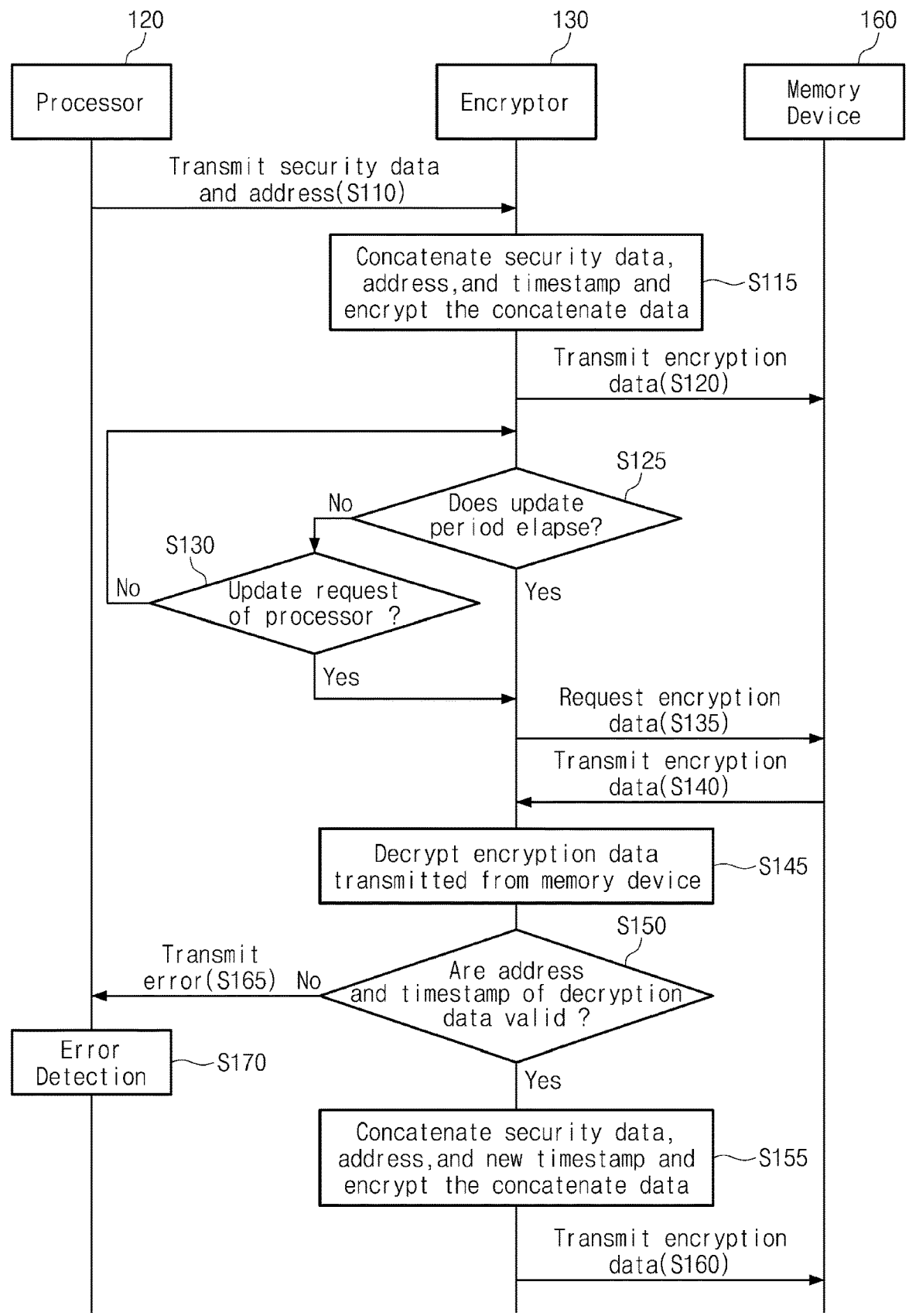
FIG. 13 is a signal sequence diagram illustrating an operation among a processor, an encryptor, and a memory device of FIG. 1.

FIG. 13 is a signal sequence diagram illustrating an operation among a processor, an encryptor, and a memory device of FIG. 1. FIG. 13 will be described with reference to FIGS. 1 to 12.

In operation S110, a processor 120 may transmit security data and an address for the security data to an encryptor 130.

Herein, the address may be an address of a memory device 160 and may be used to access a specific location in an encryption data area 161 of FIG. 1.

In operation S115, the encryptor 130 may concatenate security data, an address, and a timestamp and may encrypt the concatenated data into encryption data. In an embodiment, the encryptor 130 may concatenate the security data and the timestamp and may not concatenate the address.

In operation S120, the encryptor 130 may transmit the encryption data to the memory device 160. The encryption data may be stored in the encryption data area 161 of the memory device 160. After operation S120, the encryptor 130 may periodically update a timestamp stored in the encryption data area 161 to defend against various attacks of an attacker.

In operation S125, the encryptor 130 may determine whether a time elapses by an update period of a timestamp. When the time elapses (S125=Yes), operation S135 may be performed. When the time does not elapse (S125=No), operation S130 may be performed.

In operation S130, the encryptor 130 may check whether there is an update request of the processor 120. In an embodiment, the processor 120 may request the encryptor 130 to update a timestamp regardless of an update period of the timestamp. The update request of the processor 120 may occur according to a request of a user. Alternatively, the update request of the processor 120 may occur according to importance of the security data transmitted in operation S110 or importance of security data previously stored in the memory device 160.

If there is no the update request of the processor 120 (S130=No), operation S125 may be performed again. In this case, the encryptor 130 may process various commands such as a write command or a read command of the processor 120. For example, when the processor 120 issues the write command, operations S110 to S120 may be repeated.

When the time elapses by the update period of the timestamp (S125=Yes) or when there is the update request of the processor 120 (S130=Yes), operation S135 may be performed. In operation S135, the encryptor 130 may request the memory device 160 to transmit encryption data. For example, the encryptor 130 may transmit a read command for reading encryption data to the memory device 160. In operation S140, the memory device 160 may transmit the encryption data to the encryptor 130 in response to the request of the encryptor 130.

In operation S145, the encryptor 130 may decrypt the encryption data transmitted from the memory device 160 into decryption data. In operation S150, the encryptor 130 may determine or check whether each of a decryption address and a decryption timestamp is valid. In an embodiment, the encryptor 130 may determine or check whether only the decryption timestamp is valid. When it is determined that each of the decryption address and the decryption timestamp is valid (S150=Yes), operations S155 and S160 may be performed. When it is determined that each or either of the decryption address and the decryption timestamp is not valid (S150=No), operation S165 may be performed in which the encryptor 130 informs the processor 120 of the error.

When it is determined that both the decryption address and the decryption timestamp are valid (S150=Yes), the process proceeds to the operation at S155. In operation S155, the encryptor 130 may concatenate security data, an address, and a new timestamp and may encrypt the concatenated data into encryption data. Operation S155 may be similar to operation S115, but the timestamp of operation S155 may be different from the timestamp of operation S115. In other words, a timestamp for security data may be updated. In operation S160, the encryptor 130 may transmit the encryption data to the memory device 160.

In operation S165, the encryptor 130 may transmit an error to the processor 120. The error may indicate that the memory device 160 is attacked. In operation S170, the processor 120 may detect the error and may defend against the attacks. For example, the processor 120 may reboot an electronic device 100 of FIG. 1, may write security data to the memory device 160 again, or may generate and store a log file for the error. The log file may be used to analyze attacks and defend against the attacks.

In an embodiment, operations S135 to S170 may be performed on all of addresses assigned to the encryption data area 161 of the memory device 160. Thus, all of timestamps for encryption data stored in the encryption data area 161 may be updated to a new timestamp.

Figure 14:
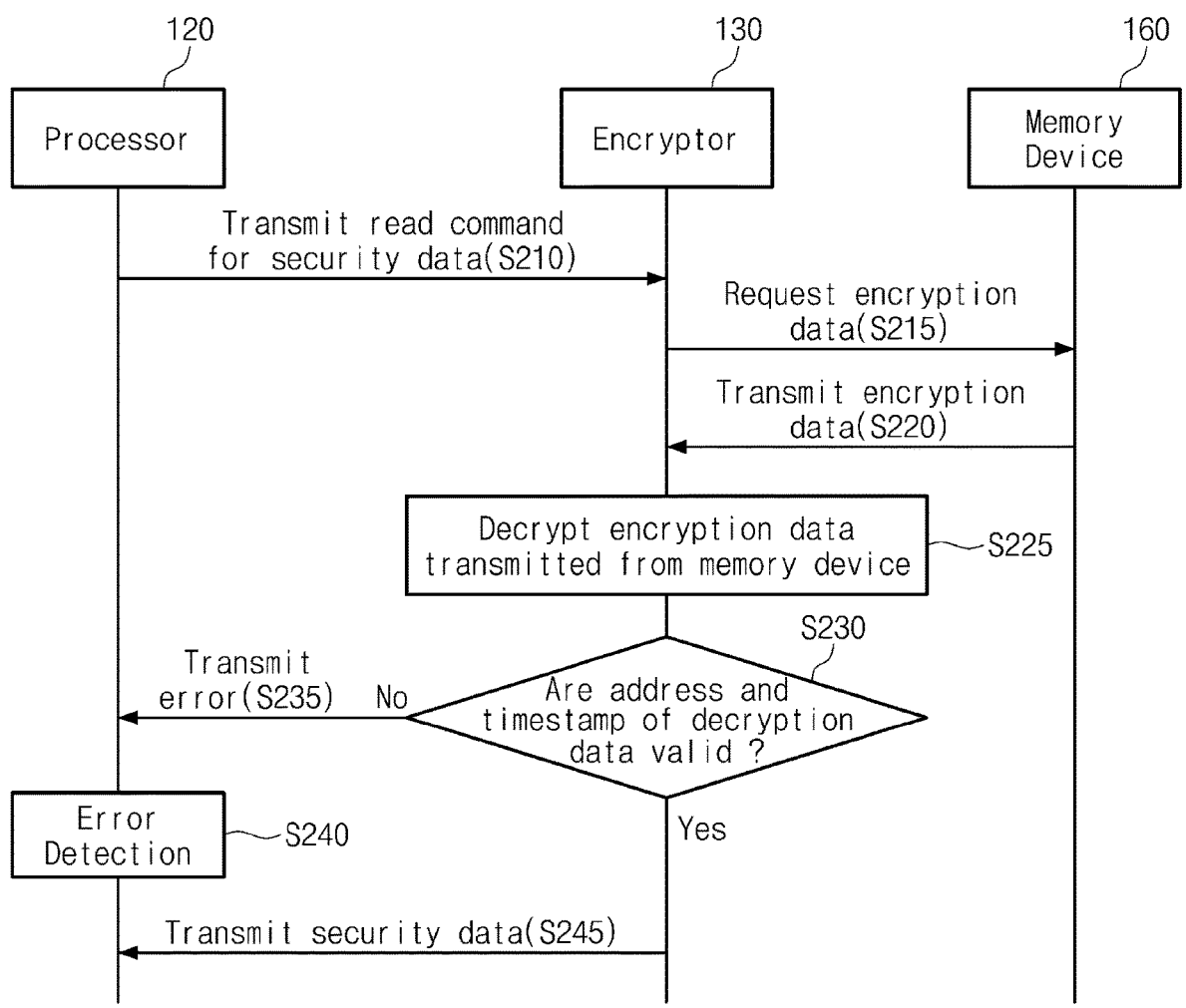
FIG. 14 is a signal sequence diagram illustrating an operation among a processor, an encryptor, and a memory device of FIG. 1.

FIG. 14 is a signal sequence diagram illustrating an operation among a processor, an encryptor, and a memory device of FIG. 1. FIG. 14 illustrates an example in which a processor 120 issues a read command. FIG. 14 will be described with reference to FIGS. 1 to 13.

In operation S210, the processor 120 may transmit a read command for security data to an encryptor 130. The processor 120 is configured to request the security data. The processor 120 may transmit an address of a memory device 160 for the security data to the encryptor 130.

In an embodiment, while the encryptor 130 updates timestamps of the memory device 160, the processor 120 may transmit a read command to the encryptor 130. A time when the read command is transmitted may be between time T2 and time T3 of FIG. 12. The encryptor 130 may determine or check that both of two timestamps (i.e., a timestamp which is transmitted to the memory device 160 and is stored in the encryptor 130, and a new timestamp generated by the encryptor 130 for an update) are valid. While updating timestamps of the memory device 160, the encryptor 130 may process a command transmitted from the processor 120.

In another embodiment, while the encryptor 130 does not update timestamps of the memory device 160, the processor 120 may transmit a read command to the encryptor 130. A time when the read command is transmitted may be, for example, between time T1 and time T2 of FIG. 12 or between time T3 and time T4 of FIG. 12. In this case, the encryptor 130 may determine or check that only one timestamp (i.e., a timestamp which is transmitted to the memory device 160 and is stored in the encryptor 130) is valid.

Operations S215 to S240 may be similar to operations S135 to S150, S165, and operation S170 of FIG. 13. Herein, an address used for a comparison operation in operation S230 by a checking logic 134 may be different from an address used for a comparison operation in operation S150 by the checking logic 134. The address used for the comparison operation in operation S230 by the checking logic 134 may be an address for the read command transmitted from the processor 120 in operation S210. On the other hand, the address used for the comparison operation in operation S150 of FIG. 13 by the checking logic 134 may be an address generated by an address generator 139 in response to an update request of a timestamp.

If the address and timestamp of the decryption data are determined to be valid by the checking logic 134 (S230=Yes), the process proceeds to S245. In operation S245, the encryptor 130 transmits security data to the processor 120 after determining or checking that both a decryption address and a decryption timestamp are valid at S230. The processor 120 may receive and process the security data. If the address and/or timestamp of the decryption data are determined not to be valid at S230 (S230=No), the process proceeds to S235 and the error is transmitted from the encryptor 130 to the processor 120.

Figure 15:
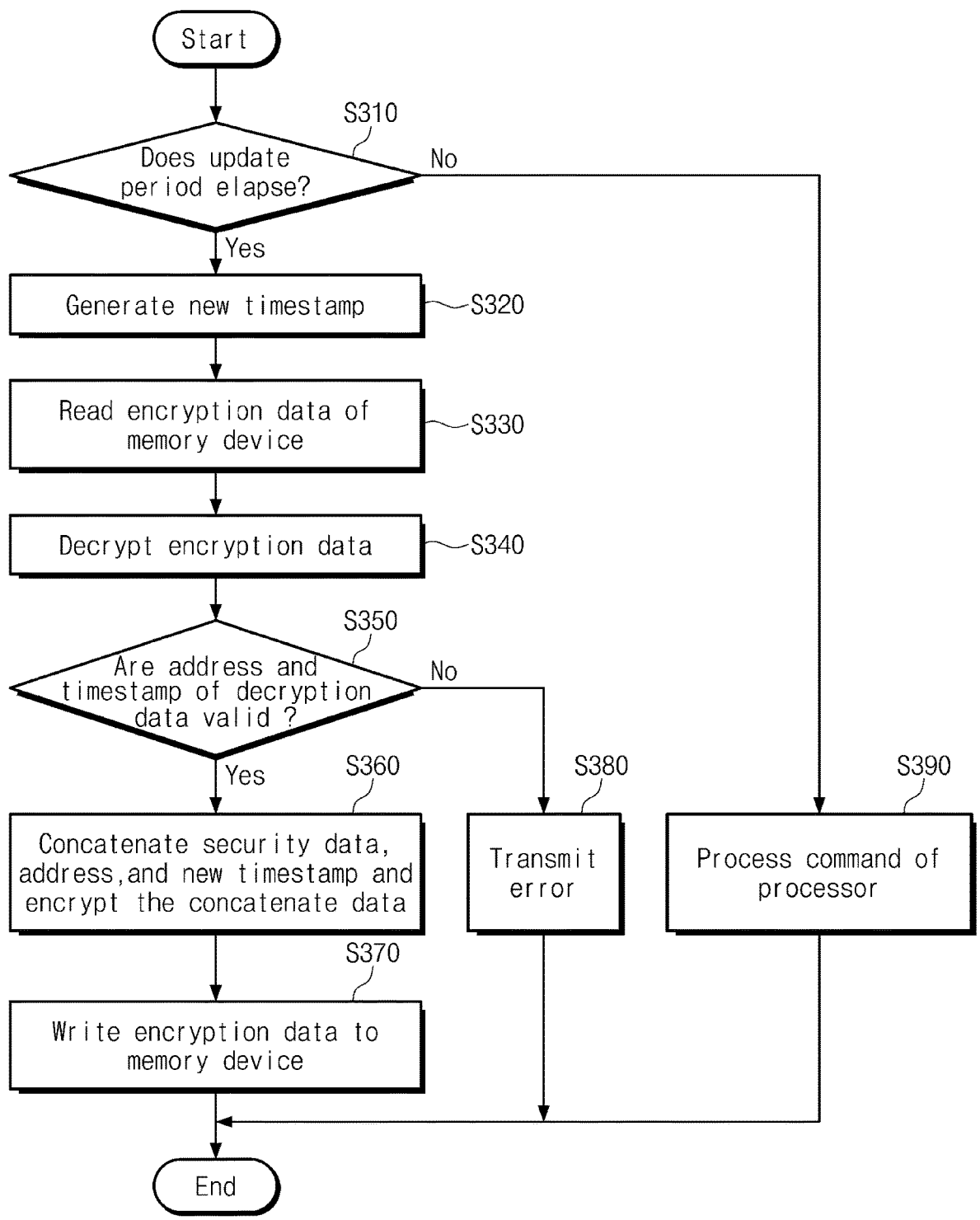
FIG. 15 is a flowchart illustrating an operation of an encryptor according to an embodiment of the present disclosure.

FIG. 15 is a flowchart illustrating an operation of an encryptor according to an embodiment of the present disclosure. FIG. 15 will be described with reference to FIGS. 1 to 14.

In operation S310, an encryptor 130 may determine whether a time elapses by an update period of a timestamp. Operation S310 may be performed by a timer 131 of the encryptor 130 and may correspond to operation S125 of FIG. 13.

When the update period is determined to elapse at S310 (S310=Yes), the process proceeds to an operation at S320. In operation S320, the encryptor 130 may generate a new timestamp for an update. Operation S320 may be performed by a counter 132 of the encryptor 130.

In operation S330, the encryptor 130 may read encryption data of a memory device 160. The encryptor 130 may receive encryption data (or read data) from the memory device 160. In operation S340, the encryptor 130 may decrypt the encryption data. In an embodiment, operation S320 may be performed together with operations S330 and S340 or may be performed after operations S330 and S340 are performed.

In operation S350, the encryptor 130 may determine or check whether each of a decryption address and a decryption timestamp is valid. In detail, the encryptor 130 may determine or check whether the decryption address is identical to an address of an address generator 139 and may determine or check whether the decryption timestamp is identical to a timestamp stored in a checking logic 134. If both the decryption address and the decryption timestamp are valid (S350=Yes), operation S360 may be performed. If the decryption address or the decryption timestamp is not valid (S350=No), operation S380 may be performed.

In operation S360, the encryptor 130 may concatenate security data and a decryption address of decryption data and a new timestamp generated in operation S320 and may encrypt the concatenated data. In operation S370, the encryptor 130 may write encryption data, a timestamp of which is updated, to the memory device 160. In operation S380, the encryptor 130 may transmit an error.

Although not illustrated, the encryptor 130 may repeatedly perform operations S320 to S380 after operation S370 or S380. Operations S320 to S380 may be repeated until all of timestamps of an encryption data area 161 are updated.

If the update period does not elapse at S310 (S310=No), the process proceeds to an operation at S390. In operation S390, the encryptor 130 may process a command of a processor 120. When the processor 120 accesses security data stored in the encryption data area 161 of the memory device 160, the encryptor 130 may determine or check whether a timestamp stored in the encryption data area 161 is valid and may determine whether the memory device 160 is attacked.

Figure 16:
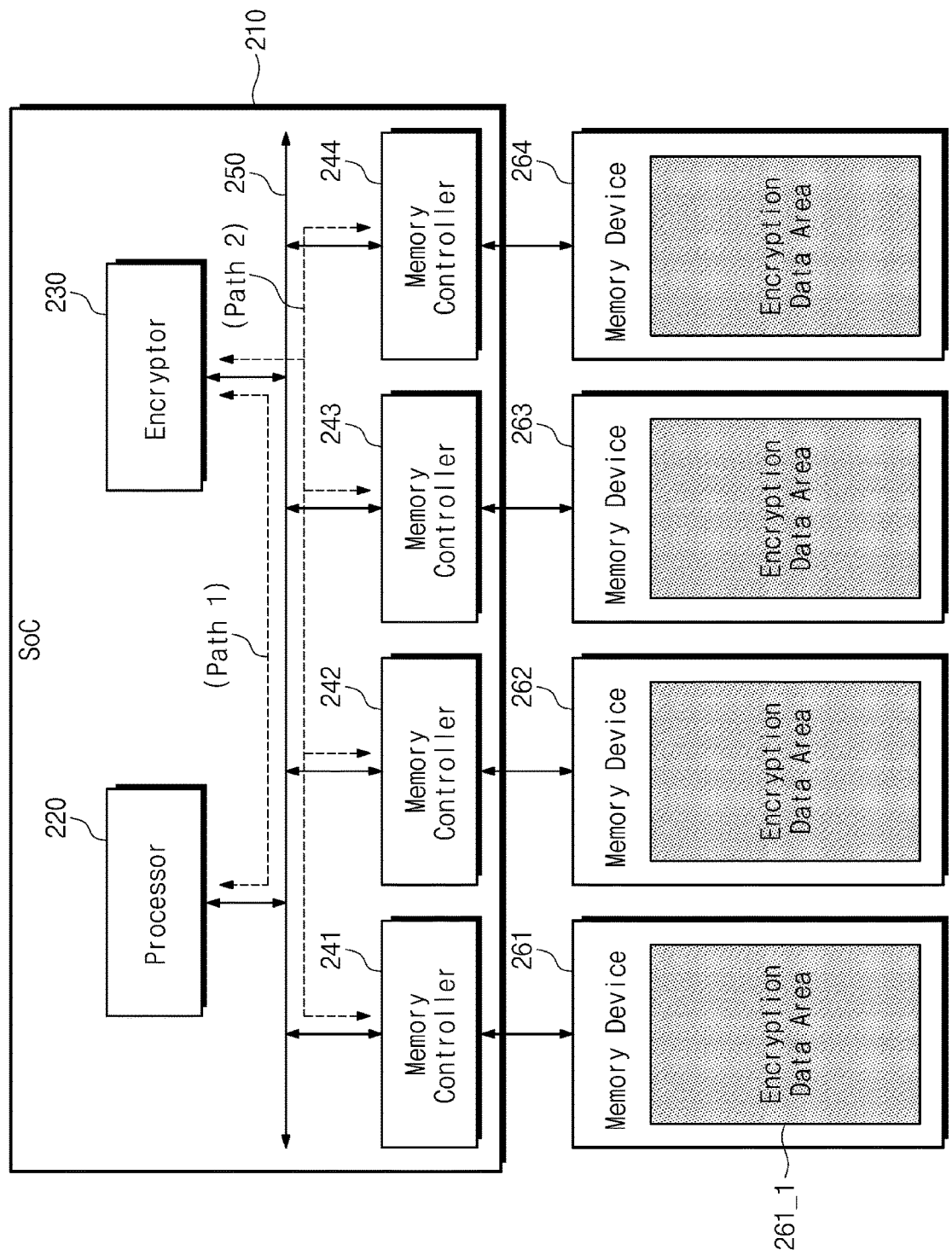
FIG. 16 is a block diagram illustrating a configuration of an electronic device according to another embodiment of the present disclosure.

FIG. 16 is a block diagram illustrating a configuration of an electronic device according to another embodiment of the present disclosure. FIG. 16 will be described with reference to FIGS. 1 to 15. An electronic device 200 may include an SoC 210 and first memory device 261 to fourth memory device 264. The SoC 210 may include a processor 220, an encryptor 230, and first memory controller 241 to fourth memory controller 244. The processor 220 may be substantially the same as a processor 120 described with reference to FIGS. 1 to 14.

The encryptor 230 may be substantially the same as an encryptor 130 described with reference to FIGS. 1 to 15. The encryptor 230 may encrypt security data transmitted through a bus 250 or may decrypt encryption data transmitted from at least one of the first memory controller 241 to fourth memory controller 244. For example, the encryptor 230 may be a slave device for the processor 220 and may be a master device for the first memory controller 241 to fourth memory controller 244.

The encryptor 230 may operate as a security memory and may receive an address space from the processor 220. The processor 220 may transmit a write command for security data to the encryptor 230 via the bus 250 using an address assigned to the encryptor 230 (see a first path Path1). The encryptor 230 may concatenate security data and a timestamp depending on a write command, may encrypt the concatenated data, and may transmit the encryption data to at least one of the first memory controller 241 to fourth memory controller 244 via the bus 250 (see a second path Path2). At least one of the first memory controller 241 to fourth memory controller 244 may store the transmitted encryption data in at least one of the first memory device 261 to fourth memory device 264.

Herein, since the encryption data is not stored in the encryptor 230 and is stored in encryption data areas of the first memory device 261 to fourth memory device 264, the encryptor 230 may be referred to as an "on-the-fly encryptor".

The encryptor 230 may update timestamps stored in the encryption data areas of the first memory device 261 to fourth memory device 264. The encryptor 230 may read encryption data from the first memory controller 241 to fourth memory controller 244. The encryptor 230 may access the encryption data areas of the first memory device 261 to fourth memory device 264 in order or randomly. The encryptor 230 may access the encryption data areas of the first memory device 261 to fourth memory device 264 in an interleaving scheme.

The encryptor 230 may decrypt encryption data and may check whether a decryption timestamp is valid. Thereafter, the encryptor 230 may transmit encryption data into which a new timestamp is encrypted, to the first memory controller 241 to fourth memory controller 244 via the bus 250. Thereafter, the new timestamp may be stored in the encryption data areas of the first memory device 261 to fourth memory device 264. In other words, the one encryptor 230 may manage timestamps of the first memory device 261 to fourth memory device 264. The one encryptor 230 may be shared by the first memory device 261 to fourth memory device 264.

The processor 220 may transmit a read command for security data to the encryptor 230 via the bus 250 using an address assigned to the encryptor 230 (see the first path Path1). The encryptor 230 may receive encryption data from at least one of the first memory controller 241 to fourth memory controller 244 depending on the read command (see the second path Path2). The encryptor 230 may decrypt encryption data and may determine whether each of a decryption timestamp and a decryption address is valid. If each of the decryption timestamp and the decryption address is valid, the encryptor 230 may transmit security data to the processor 220 via the bus 250 (see the first path Path1).

In an embodiment, contrary to being shown, the SoC 210 may include the same number of encryptors as the number of the first memory device 261 to fourth memory device 264. In this case, the encryptors may access the first memory device 261 to fourth memory device 264, respectively. For example, the shown encryptor 230 may update only a timestamp of the encryption data area 261_1 of the first memory device 261 and may not access the second memory device 262 to fourth memory device 264.

The first memory controller 241 to fourth memory controller 244 may control the first memory device 261 to fourth memory device 264 according to requests of the processor 220 or the encryptor 230, respectively. Each of the first memory controller 241 to fourth memory controller 244 may provide an interface for communication between the SoC 210 and the first memory device 261 to fourth memory device 264. The first memory controller 241 to fourth memory controller 244 may transmit data to the first memory device 261 to fourth memory device 264 according to requests of the processor 220 or the encryptor 230, respectively. The first memory controller 241 to fourth memory controller 244 may also provide data respectively transmitted from the first memory device 261 to fourth memory device 264 to the processor 220 or the encryptor 230.

In an embodiment, the first memory controller 241 to fourth memory controller 244 may operate according to an interface protocol associated with a double data rate (DDR). In another embodiment, the first memory controller 241 to fourth memory controller 244 may operate according to one or more of various interface protocols, such as a universal serial bus (USB), a small computer system interface (SCSI), a peripheral component interconnect express (PCIe), a mobile PCIe (M-PCIe), an advanced technology attachment (ATA), a parallel ATA (PATA), a serial ATA (SATA), a serial attached SCSI (SAS), integrated drive electronics (IDE), and a universal flash storage (UFS), associated with the first memory device 261 to fourth memory device 264.

The bus 250 may provide a data input/output path, a command input/output path, or the like between the processor 220, the encryptor 230, and the first memory controller 241 to fourth memory controller 244. For example, the bus 250 may be implemented as an advanced microcontroller bus architecture (AMBA), an advanced high-performance bus (AHB), an advanced peripheral bus (APB), an advanced extensible interface (AXI), an advanced system bus (ASB), or AXI coherency extensions (ACE), or a combination thereof. However, embodiments are not limited thereto.

The first memory device 261 to fourth memory device 264 may operate based on control of the first memory controller 241 to fourth memory controller 244, respectively. The number of the first memory device 261 to fourth memory device 264 shown in FIG. 16 is only an example. The number of memory controllers for controlling memory devices is not limited to being shown.

The first memory device 261 may include the encryption data area 261_1. For example, all data areas of the first memory device 261 may be previously set to the encryption data area 261_1 according to a request of the SoC 210.

In an embodiment, the first memory device 261 may be one or a combination of various dynamic random-access memory (DRAM) devices such as a DDR synchronous DRAM (DDR SDRAM), a DDR2 SDRAM, a DDR3 SDRAM, a DDR4 SDRAM, a DDR5 SDRAM, a low power double data rate (LPDDR) SDRAM, an LPDDR2 SDRAM, an LPDDR3 SDRAM, an LPDDR4 SDRAM, an LPDDR4X SDRAM, an LPDDR5 SDRAM, a graphics double data rate (GDDR) synchronous graphic RAM (S GRAM), a GDDR2 SGRAM, a GDDR3 SGRAM, a GDDR4 SGRAM, a GDDR5 SGRAM, and a GDDR6 SGRAM. Further, the first memory device 261 may be a memory device in which DRAM dies are stacked, for example, a high bandwidth memory (HBM), an HBM2, or an HBM3. Further, the first memory device 261 may be a static random-access memory (SRAM) device, a NAND flash memory device, a NOR flash memory device, a resistive random-access memory (RRAM) device, a ferroelectric RAM (FRAM) device, a phase change RAM (PRAM) device, a thyristor RAM (TRAM) device, a magnetic RAM (MRAM) device, or the like.

Each of the second memory device 262 to fourth memory device 264 may be implemented or may not be implemented in the same manner as the first memory device 261. One of the first memory device 261 to fourth memory device 264 may be different from the other memory devices. For example, each of the first memory device 261 to third memory device 263 may be a general-purpose DRAM device, and the fourth memory device 264 may be a DRAM device for graphic or may be an HBM device for a high bandwidth. Regardless of types of the first memory device 261 to fourth memory device 264, the encryptor 230 according to an embodiment of the present disclosure may store a timestamp together with encryption data in the encryption data areas of the first memory device 261 to fourth memory device 264 and may periodically update the stored timestamp.

In another embodiment, the first memory device 261 to fourth memory device 264 may configure a dual in-line memory module (DIMM) complying with a joint electron device engineering council (JEDEC) standard. Alternatively, the first memory device 261 to fourth memory device 264 may configure a registered DIMM (RDIMM), a load reduced DIMM (LRDIMM), an unbuffered DIMM (UDIMM), a fully buffered DIMM (FB-DIMM), a small outline DIMM (SO-DIMM), or another memory module (e.g., a single in-line memory module (SIMM)).

In another embodiment, the first memory device 261 may be implemented using various semiconductor packages. For example, the semiconductor packages may include a package on package (PoP), ball grid arrays (BGAs), chip scale packages (CSPs), a plastic leaded chip carrier (PLCC), a plastic dual in-line package (PDIP), a die in waffle pack, a die in wafer form, a chip on board (COB), a ceramic dual in-line package (CERDIP), a metric quad flat pack (MQFP), a thin quad flat pack (TQFP), a small outline integrated circuit (SOIC), a shrink small outline package (SSOP), a thin small outline package (TSOP), a system in package (SIP), a multi chip package (MCP), a wafer-level fabricated package (WFP), a wafer-level processed stack package (WSP), and the like. Each of the second memory device 262 to fourth memory device 264 may be implemented using any of the above-mentioned various semiconductor packages. Each of the first memory device 261 to fourth memory device 264 may be a memory die, and all of the first memory device 261 to fourth memory device 264 may be included in one package (using through silicon vias). The SoC 210 may be implemented using the above-mentioned various semiconductor packages.

Figure 17:
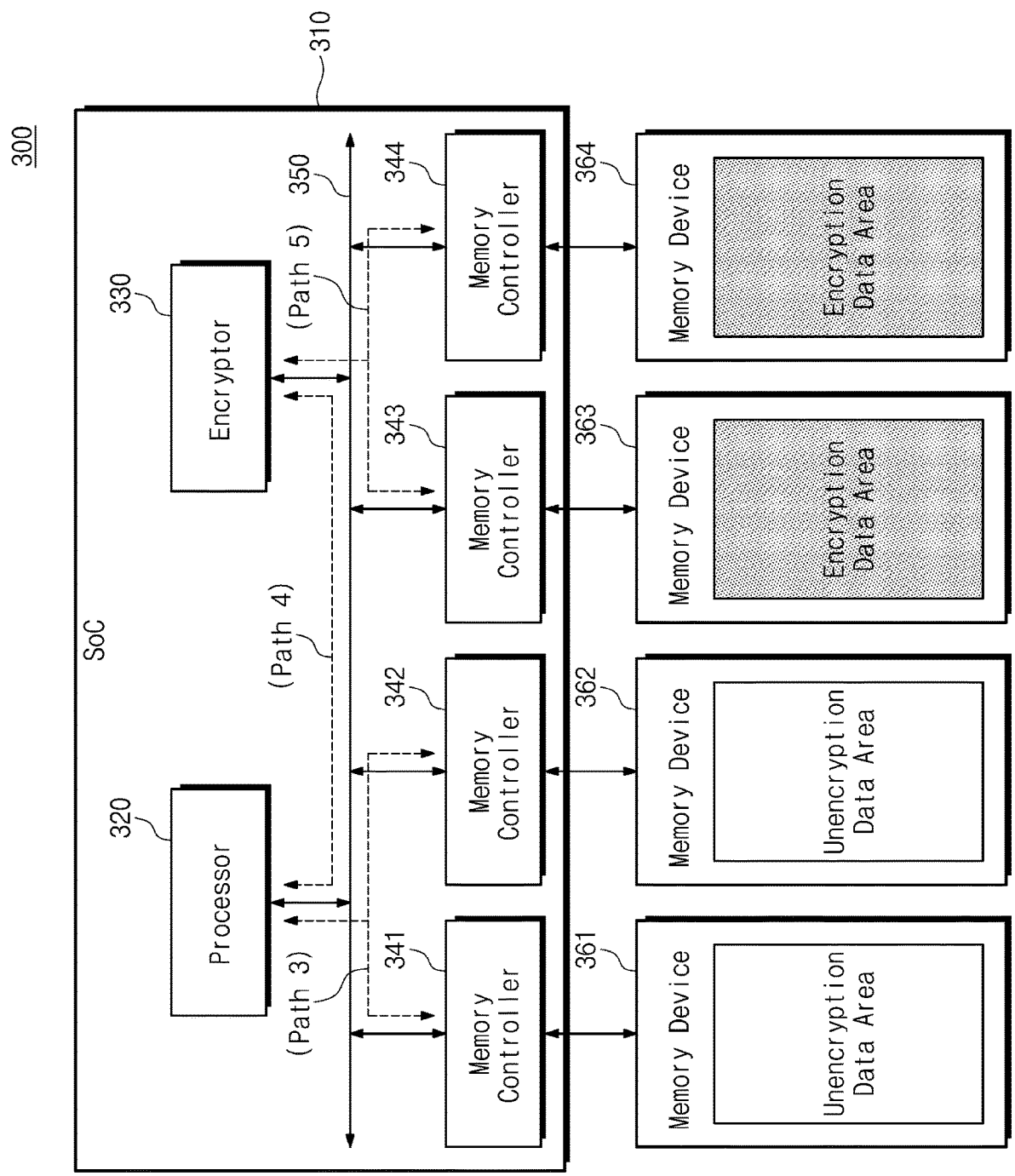
FIG. 17 is a block diagram illustrating a configuration of an electronic device according to another embodiment of the present disclosure.

FIG. 17 is a block diagram illustrating a configuration of an electronic device according to another embodiment of the present disclosure. In FIG. 17, a description will be given of a difference between an electronic device 300 and an electronic device 200 of FIG. 16.

An SoC 310 may be implemented in substantially the same manner as an SoC 210 of FIG. 16. Herein, the SoC 310 may set data areas of first memory device 361 and second memory device 362 to unencryption data areas and may set data areas of third and fourth memory devices 363 and 364 to encryption data areas. An operation of accessing the third and fourth memory devices 363 and 364 by the SoC 310 may be substantially the same as an operation of accessing the first memory device 261 to fourth memory device 264 by the SoC 210 of FIG. 16.

A processor 320 may store normal data rather than security data in the first memory device 361 and second memory device 362 or may read the normal data from the first memory device 361 and second memory device 362 (see a third path Path3). In other words, in case of the normal data, the processor 320 may immediately use first memory controller 341 and second memory controller 342 without using an encryptor 330. Thus, an input/output path (e.g., a third path Path3) of the normal data and an input/output path (e.g., fourth path Path4 and fifth path Path5) of security data are divided. In other words, there may be no delay due to the encryptor 330 in a data input/output of the normal data.

Figure 18:
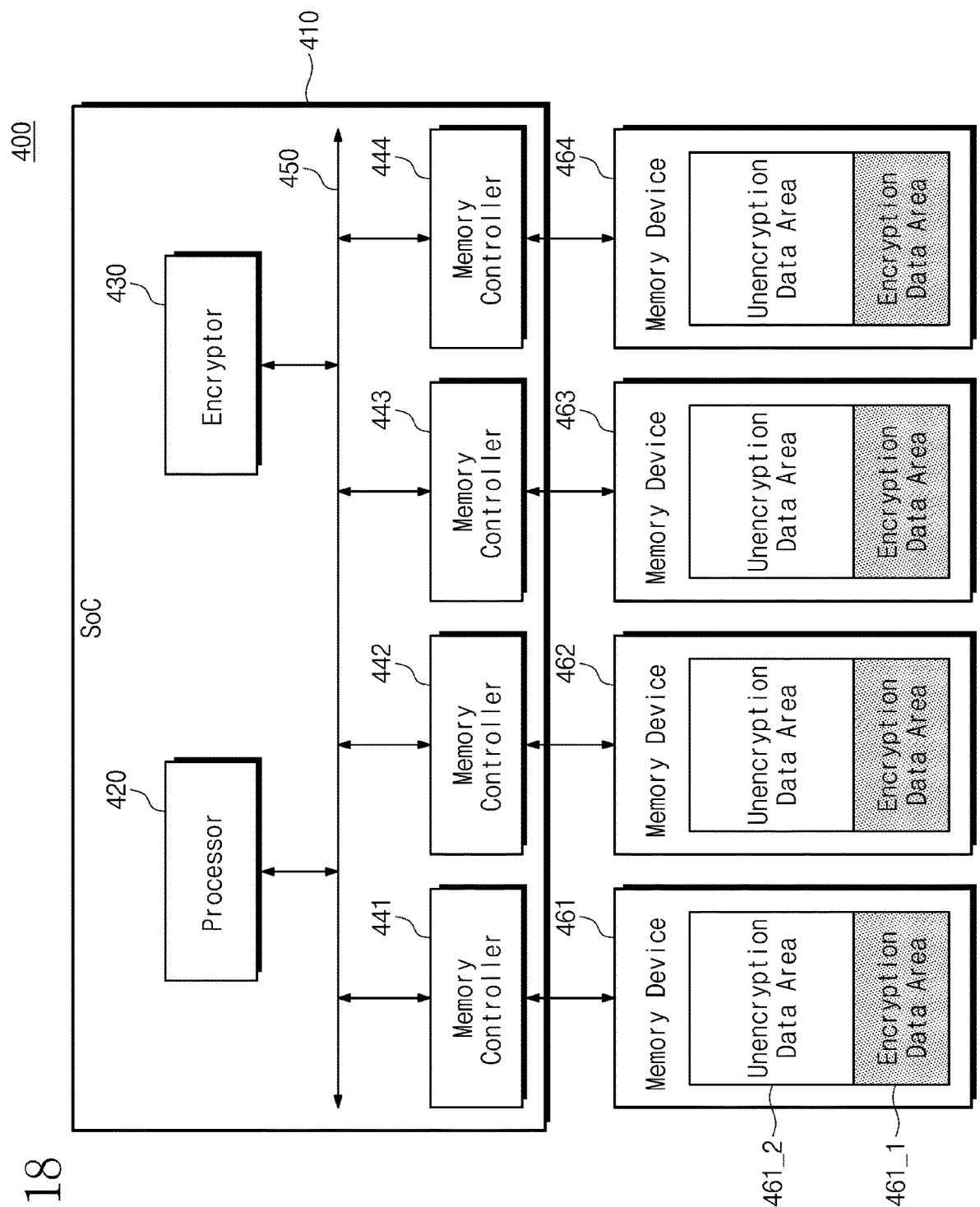
FIG. 18 is a block diagram illustrating a configuration of an electronic device according to another embodiment of the present disclosure.

FIG. 18 is a block diagram illustrating a configuration of an electronic device according to another embodiment of the present disclosure. In FIG. 18, a description will be given of a difference between an electronic device 400 and electronic device 200 and electronic device 300 of FIGS. 16 and 17.

An SoC 410 may be implemented in substantially the same manner as an SoC 210 of FIG. 16. Herein, the SoC 410 may set a portion of a data area of each of first memory device 461 to fourth memory device 464 to an encryption data area and may set the rest of the data area to an unencryption data area. The first memory device 461 to fourth memory device 464 may be implemented in the same manner as first memory device 261 to fourth memory device 264 of FIG. 16, but a data area of a memory device may be differently set according to a setting of the SoC 410.

According to a setting of the SoC 410, a data area of the first memory device 461 may be divided into an encryption data area 461_1 and an unencryption data area 461_2. Data areas of the second memory device 462 to fourth memory device 464 may be set in a similar manner to the data area of the first memory device 461. Herein, encryption data areas of the first memory device 461 to fourth memory device 464 may be the same as each other in size or may be different from each other in size. Additionally, unencryption data areas of the first memory device 461 to fourth memory device 464 may be the same as each other in size or may be different from each other in size.

In an embodiment, an operation of accessing the encryption data areas of the first memory device 461 to fourth memory device 464 by the SoC 410 may be substantially the same as an operation of accessing the first memory device 261 to fourth memory device 264 by the SoC 210 of FIG. 16. An operation of accessing the unencryption data areas of the first memory device 461 to fourth memory device 464 by the SoC 410 may be substantially the same as an operation of accessing the first memory device 361 and second memory device 362 by an SoC 310 of FIG. 17.

Figure 19:
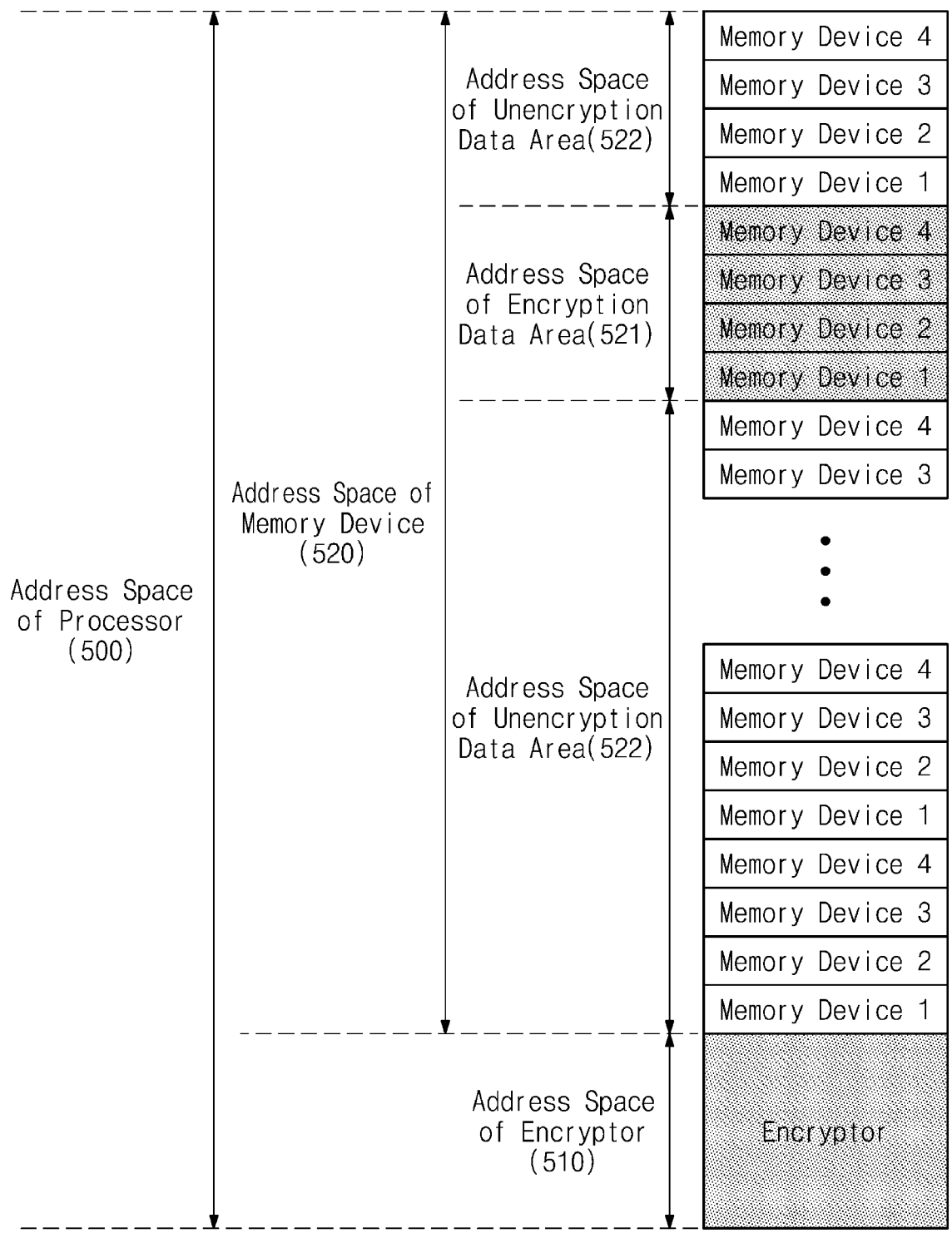
FIG. 19 is a drawing illustrating an address space of a processor of FIG. 18.

FIG. 19 is a drawing illustrating an address space of a processor of FIG. 18. FIG. 19 will be described with reference to FIG. 18. An address space 500 of a processor may be a logic address space accessed by a processor 420 of FIG. 18. The address space 500 of the processor may include an address space 510 of an encryptor and an address space 520 of first memory device 461 to fourth memory device 464.

The address space 510 of the encryptor may be recognized like the address space 520 of the first memory device 461 to fourth memory device 464 by the processor 420. The address space 520 of the first memory device 461 to fourth memory device 464 may be formed while some of data areas of the first memory device 461 to fourth memory device 464 are interleaved with each other. One row of the address space 520 of the first memory device 461 to fourth memory device 464 may indicate a space capable of storing encryption data. For example, a size of the one row may correspond to a unit of an encryption operation of an encryption/decryption unit 133, for example, 128 bits or 256 bits.

The address space 520 of the first memory device 461 to fourth memory device 464 may include an address space 521 of an encryption data area and an address space 522 of an unencryption data area. For example, the address space 521 of the encryption data area may be identical to the address space 510 of the encryptor in size.

Figure 20:
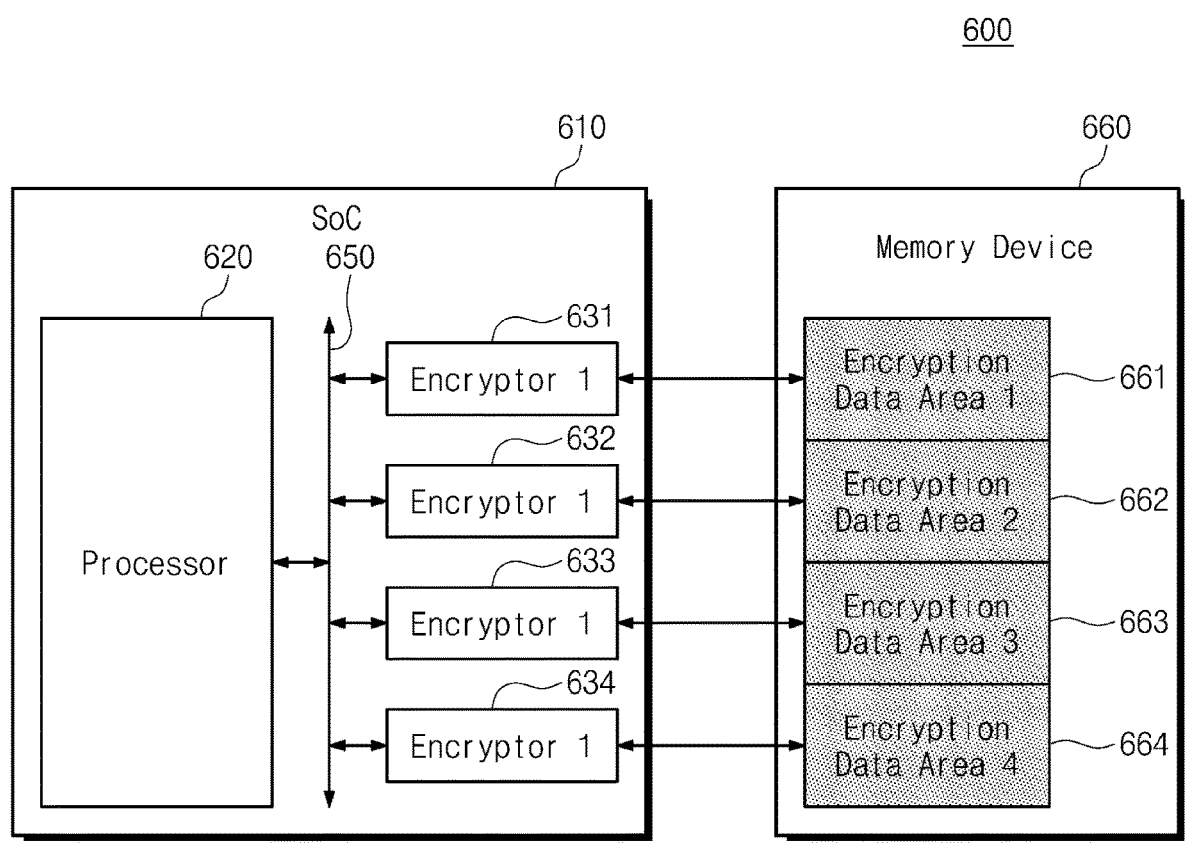
FIG. 20 is a block diagram illustrating a configuration of an electronic device according to another embodiment of the present disclosure.

FIG. 20 is a block diagram illustrating a configuration of an electronic device according to another embodiment of the present disclosure. An electronic device 600 may include an SoC 610 and a memory device 660. In FIG. 20, a description will be given of a difference between the electronic device 600 and electronic devices of FIGS. 16 to 18.

The SoC 610 may include a processor 620 and first encryptor 631 to fourth encryptor 634. The processor 620 and the first encryptor 631 to fourth encryptor 634 may communicate with each other via a bus 650.

Each of the first encryptor 631 to fourth encryptor 634 may be implemented in substantially the same manner as an encryptor 130 described with reference to FIGS. 1 to 15. In FIGS. 16 to 18, each of encryptors 230, 330, and 430 may manage timestamps of encryption data areas of one or more memory devices. However, in FIG. 20, each of the first encryptor to fourth encryptor 634 may manage a timestamp of each of the first encryption data area 661 to fourth encryption data area 664. Thus, the number of valid timestamps in the memory device 660 may be one or more, and timestamps of the first encryption data area 661 to fourth encryption data area 664 may be independently updated by the first encryptor 631 to fourth encryptor 634.

In an embodiment, although not illustrated, when the electronic device 600 includes four memory devices, each of the first encryptor 631 to fourth encryptor 634 may manage a timestamp of an encryption data area of each of the four memory devices. The number of encryptors, the number of encryption data areas, and the number of memory devices are not limited to what is shown in FIG. 20.

Figure 21:
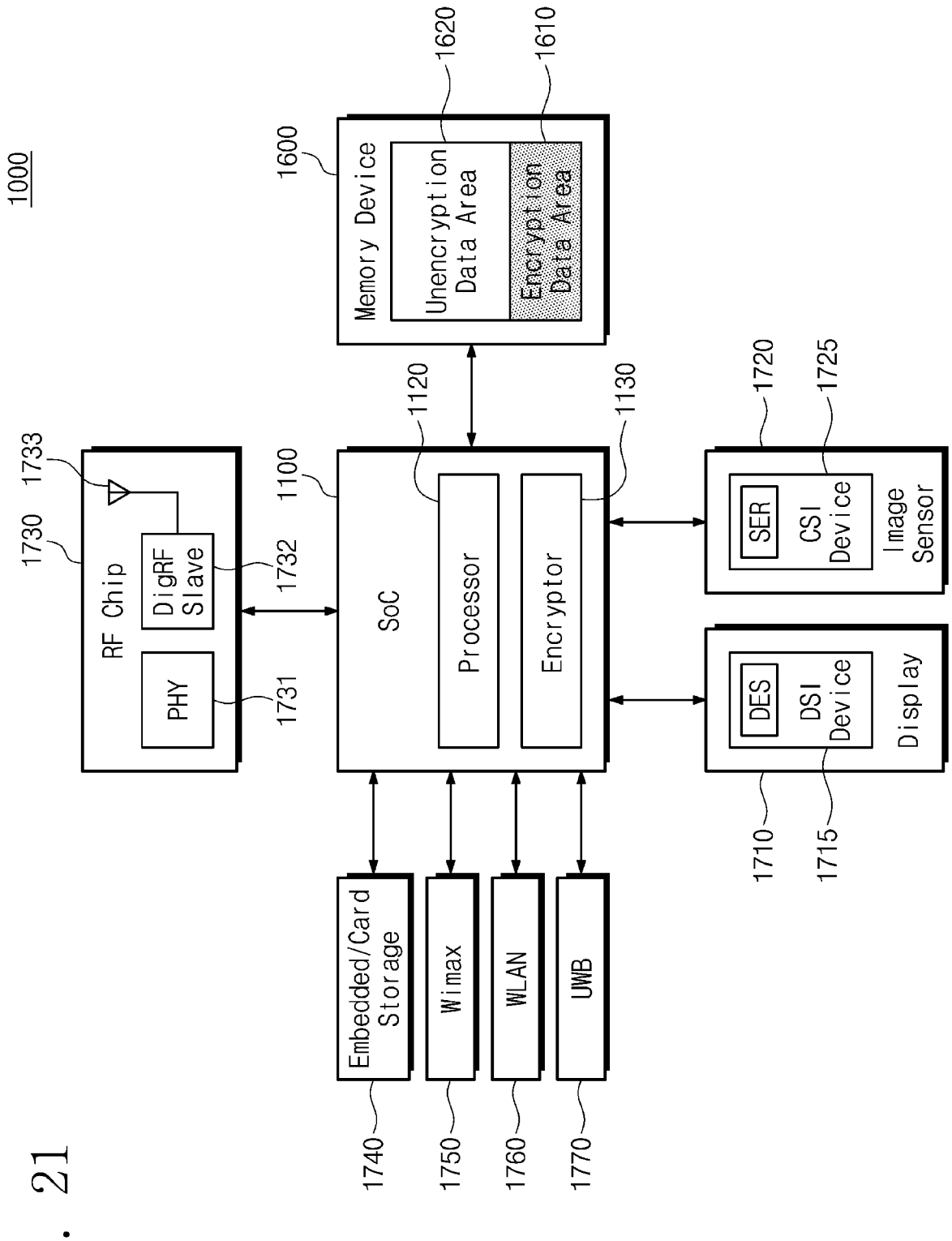
FIG. 21 is a block diagram illustrating a configuration of an electronic device according to another embodiment of the present disclosure.

FIG. 21 is a block diagram illustrating a configuration of an electronic device according to another embodiment of the present disclosure. An electronic device 1000 may be implemented as an electronic device capable of using or supporting interfaces proposed by a mobile industry processor interface (MIPI) alliance. For example, the electronic device 1000 may be, but is not limited to, one of a server, a computer, a smartphone, a tablet, a personal digital assistant (PDA), a digital camera, a portable multimedia player (PMP), a wearable device, an Internet of things (IoT) device, or the like.

The electronic device 1000 may include an SoC 1100 and a memory device 1600. The SoC 1100 may include a processor 1120 and an encryptor 1130 and may be implemented in substantially the same manner as SoC 110, SoC 210, SoC 310, SoC 410, and SoC 610 described with reference to FIGS. 1 to 20. The memory device 1600 may include an encryption data area 1610 and an unencryption data area 1620 and may be substantially the same as memory devices 160, 261 to 264, 361 to 364, 461 to 464, and 660 described with reference to FIGS. 1 to 20.

The electronic device 1000 may further include a display 1710 which communicates with the SoC 1100. The SoC 1100 may communicate with a DSI device 1715 (display serial interface device) depending on a DSI. For example, an optical deserializer DES may be implemented in the DSI device 1715.

The electronic device 1000 may further include an image sensor 1720 which communicates with the SoC 1100. The SoC 1100 may communicate with a CSI device 1725 (camera serial interface device) depending on a CSI. For example, an optical serializer SER may be implemented in the CSI device 1725.

The electronic device 1000 may further include a RF chip 1730 (radio frequency chip) which communicates with the SoC 1100. The RF chip 1730 may include a PHY 1731 (physical layer), a DigRF slave 1732, and an antenna 1733. For example, the PHY 1731 of the RF chip 1730 and the SoC 1100 may exchange data with each other by a DigRF interface proposed by the MIPI alliance.

The electronic device 1000 may further include an embedded/card storage 1740. The embedded/card storage 1740 may store data provided from the SoC 1100 and may permanently store data provided from the memory device 1600. The electronic device 1000 may communicate with an external system through a world interoperability for microwave access (WiMax) 1750, a wireless local area network (WLAN) 1760, an ultra wide band (UWB) 1770, or the like.

The electronic device 1000 may further include other elements (e.g., a speaker, a microphone, a global positioning system GPS, and the like) other than the elements shown in FIG. 21.

According to an embodiment of the present disclosure, in the electronic device 1000, security data may be stored in the encryption data area 1610 of the memory device 1600. The encryptor 1130 may periodically update a timestamp for security data and may determine whether a timestamp stored in the encryption data area 1610 is changed by an attack. Thus, the electronic device 1000 may defend against an attack on the memory device 1600.

According to an embodiment of the present disclosure, the encryption device may encrypt security data and a timestamp and may store encryption data in a memory device. Thus, the encryption device may periodically update a timestamp stored in the memory device. The encryption device may determine whether the timestamp stored in the memory devices is changed by an attack on the memory device. Thus, the encryption device may defend against the attack on the memory device.

While the inventive concepts of the present disclosure have been described with reference to exemplary embodiments, it will be apparent to those skilled in the art that various changes and modifications may be made without departing from the spirit and scope of the inventive concepts. Therefore, it should be understood that the above embodiments are not limiting, but illustrative.

What is claimed is:

1. An encryption device, comprising:
  a counter configured to generate a first timestamp for a first time;
  an encryption/decryption unit configured to concatenate security data and the first timestamp into concatenated data, encrypt the concatenated data into encryption data, transmit the encryption data to a memory device, and decrypt read data transmitted from the memory device into decryption data; and
  a timer configured to request that the counter and the encryption/decryption unit update a timestamp, such that the timestamp of the encryption data of the memory device is updated from the first timestamp to a second timestamp for a second time,
  wherein checking logic implemented by the encryption device is configured to check whether a decryption timestamp of the decryption data is identical to the first timestamp before updating the timestamp of the encryption data of the memory device to the second timestamp.

2. The encryption device of claim 1, wherein each of a size of the security data and a size of the first timestamp is identical to a size of a unit of an encryption operation of the encryption/decryption unit.

3. The encryption device of claim 1, wherein, before the timer requests an update, the checking logic is further configured to output an error indicating that the memory device is attacked, when the decryption timestamp is not identical to the first timestamp.

4. The encryption device of claim 1, wherein, after the timer requests an update, the encryption/decryption unit is further configured to, when the decryption timestamp is identical to the first timestamp,
  concatenate the security data of the decryption data and the second timestamp into new concatenated data;
  encrypt the new concatenated data into new encryption data; and
  transmit the new encryption data to the memory device.

5. The encryption device of claim 1, wherein the encryption/decryption unit is further configured to further concatenate an address for the security data with the concatenated data into which the security data and the first timestamp are concatenated.

6. The encryption device of claim 5, wherein each of a size of the security data and a concatenated size of the first timestamp and the address for the security data is identical to a size of a unit of an encryption operation of the encryption/decryption unit.

7. The encryption device of claim 5, wherein, before the timer requests an update, the checking logic is further configured to, when the decryption timestamp is not identical to the first timestamp or a decryption address of the decryption data is not identical to the address for the security data, output an error indicating that the memory device is attacked.

8. The encryption device of claim 5, wherein, after the timer requests an update, the encryption/decryption unit is further configured to, when the decryption timestamp is identical to the first timestamp and a decryption address of the decryption data is identical to the address for the security data,
  concatenate the security data of the decryption data, the decryption address of the decryption data, and the second timestamp into new concatenated data;
  encrypt the new concatenated data into new encryption data; and
  transmit the new encryption data to the memory device.

9. A system on chip (SoC), comprising:
  a processor configured to generate security data;
  a counter configured to generate a timestamp to be concatenated with the security data;
  an encryption/decryption unit configured to concatenate the security data and the timestamp into concatenated data, encrypt the concatenated data into encryption data, and transmit the encryption data to a memory device in response to a write command of the processor for storing the security data in the memory device, and decrypt read data transmitted from the memory device into decryption data in response to a request of a timer or a request of the processor; and the timer, wherein the timer is configured to periodically request an update of the timestamp of the encryption data stored in the memory device, wherein checking logic implemented by the system on chip is configured to check whether a decryption timestamp of the decryption data is identical to the previously-concatenated timestamp.

10. The system on chip of claim 9, wherein an update period of the timestamp is a pre-determined value or a value changed by the request of the processor.

11. The system on chip of claim 10, wherein the counter is further configured to increase or decrease a value of the timestamp per the update period.

12. The system on chip of claim 9, wherein the checking logic is further configured to, when the decryption timestamp is not valid identical to the previously-concatenated timestamp, output an error indicating that the memory device is attacked to the processor.

13. The system on chip of claim 9, wherein the encryption/decryption unit is further configured to, when the decryption timestamp is identical to the previously concatenated timestamp, in response to the request of the timer, concatenate security data of the decryption data and a new timestamp updated by the counter, into new concatenated data;

encrypt the new concatenated data into new encryption data; and transmit the new encryption data to the memory device.

14. The system on chip of claim 13, wherein the checking logic is further configured to compare the new timestamp updated by the counter with the decryption timestamp.

15. An electronic device, comprising:

a memory device configured to store first encryption data into which security data and a first timestamp are encrypted; and a system on chip (SoC) configured to:

decrypt the first encryption data stored in the memory device into decryption data;

check whether a timestamp of the decryption data is identical to the first timestamp to obtain a checked result;

update the first timestamp within the decryption data to a second timestamp; and store second encryption data, into which the decryption data updated with the second timestamp is encrypted, in the memory device instead of the first encryption data.

16. The electronic device of claim 15, wherein the first timestamp indicates a first time, and wherein the system on chip comprises:

a counter configured to generate the second timestamp indicating a second time and a third timestamp indicating the first time when the first encryption data is stored in the memory device;

a timer configured to request an update of the first timestamp as the elapse of time from the first time to the second time; and an encryption/decryption unit configured to concatenate the security data and the second timestamp into concatenated data, encrypt the concatenated data into the second encryption data, and transmit the second encryption data to the memory device, based on the checked result, in response to a request of the timer.

17. The electronic device of claim 16, wherein the system on chip further comprises:

a checking logic configured to check whether the first timestamp is identical to the third timestamp.

18. The electronic device of claim 16, wherein checking logic implemented by the system on chip is configured to check whether the first timestamp is identical to the third timestamp or the second timestamp.

19. The electronic device of claim 16, wherein the system on chip further comprises a processor configured to request the security data of the first encryption data stored in the memory device.

20. The electronic device of claim 19, wherein the encryption/decryption unit is further configured to, when the timestamp of the encryption data is identical to the first timestamp, output the security data to the processor, in response to a request of the processor.

\* \* \* \* \*